US007239638B2

(12) United States Patent
Wisler et al.

(10) Patent No.: US 7,239,638 B2
(45) Date of Patent: Jul. 3, 2007

(54) SYSTEMS AND METHODS FOR THE EMULATION OF TDM CIRCUITS OVER A REAL-TIME SCHEDULED PACKET NETWORK

(75) Inventors: Dale J. Wisler, Atkinson, NH (US); Howard C. Reith, Somersworth, NH (US); David A. Milley, Merrimac, MA (US)

(73) Assignee: Avaya Technology, LLC, Basking Ridge, NJ (US)

( * ) Notice: Subject to any disclaimer, the term of this patent is extended or adjusted under 35 U.S.C. 154(b) by 923 days.

(21) Appl. No.: 10/383,698

(22) Filed: Mar. 7, 2003

(65) Prior Publication Data

US 2003/0219012 A1   Nov. 27, 2003

Related U.S. Application Data

(60) Provisional application No. 60/394,775, filed on Jul. 10, 2002, provisional application No. 60/362,364, filed on Mar. 7, 2002.

(51) Int. Cl.
*H04L 12/56* (2006.01)
*H04L 12/28* (2006.01)

(52) U.S. Cl. ............... 370/395.4; 370/442; 370/359; 370/395.21; 370/395.52; 370/395.53

(58) Field of Classification Search ............ 370/395.4, 370/359, 442, 395.21, 395.52, 395.53
See application file for complete search history.

(56) References Cited

U.S. PATENT DOCUMENTS

| | | | |
|---|---|---|---|
| 6,912,225 B1* | 6/2005 | Kohzuki et al. ............ | 370/412 |
| 7,042,843 B2* | 5/2006 | Ni .............................. | 370/231 |
| 2002/0093912 A1* | 7/2002 | Gummalla et al. ......... | 370/229 |
| 2003/0120705 A1* | 6/2003 | Chen et al. ................ | 709/104 |

\* cited by examiner

*Primary Examiner*—George Eng
*Assistant Examiner*—Huy Phan
(74) *Attorney, Agent, or Firm*—Chapin IP Law, LLC; David W. Rouille, Esq.; Barry W. Chapin, Esq.

(57) ABSTRACT

A system and method to emulate any TDM circuit on a Real-Time Scheduled Packet Network. The TDM circuit can be any serial or parallel bit stream, of any bit rate, and can either be synchronized to the Real-Time Scheduled Packet Network, or can be asynchronous to the network. The present system and method determines the requisite descriptors of a scheduled IP itinerary for any emulated TDM circuit.

22 Claims, 4 Drawing Sheets

SYNCHRONOUS METHOD

ASYNCHROUOUS METHOD

SYNCHRONOUS METHOD

ASYNCHRONOUS METHOD

SYSTEMS AND METHODS FOR THE EMULATION OF TDM CIRCUITS OVER A REAL-TIME SCHEDULED PACKET NETWORK

CROSS REFERENCE TO RELATED APPLICATIONS

The present U.S. patent application claims priority under 35 U.S.C. § 119(e) to U.S. Provisional Application No. 60/362,364 filed Mar. 7, 2002 and U.S. Provisional Application No. 60/394,775 filed Jul. 10, 2002, both of which are incorporated herein by reference in their entirety.

BACKGROUND OF THE INVENTION

The present invention relates generally to the implementation of a mechanism to convert Time Domain Multiplexed (TDM) circuits into scheduled Internet Protocol (IP) packet flows. These scheduled IP packets traverse a network as an itinerary of appointments. The method herein calculates the required number of appointments per itinerary, as well as possible packet sizes, schedule efficiency, and packetization delay.

Service Providers have expressed the desire to carry TDM circuits—especially private line services—on their IP backbone networks. The goal is to reduce the operational expense of managing separate TDM and IP networks. Circuit emulation over Asynchronous Transport Mode (ATM) networks is another possibility, but introduces another network layer and associated operational expense.

The conversion of TDM circuits to conventional IP packets is not new, and efforts are underway to standardize one or more approaches. One such standards arena is the Internet Engineering Task Force (LEIF) Pseudo Wire Emulation Edge-to-Edge (PWE3) Working Group. The Working Group recognizes that there may be limitations in their approach, given that IP does not offer the same level of quality of service as a TDM circuit does.

A TDM circuit, once established, offers a bandwidth that is completely free of contention from other circuits. If an application or service has a dedicated TDM circuit, then it has guaranteed bandwidth at all times.

A conventional IP network cannot make such claims for any of the flows in its network, as long as there is more than one flow that contends for bandwidth somewhere along the path. Various prioritization and traffic engineering schemes have been proposed and implemented to combat this problem, but the result remains that jitter-free bandwidth cannot be guaranteed.

Real-Time Scheduled Packet Networks provide deterministic, scheduled flow paths for IP packets with minimal queuing delay and no jitter or packet loss. This technology is ideal for real-time IP traffic and for emulating TDM circuits.

SUMMARY OF THE INVENTION

TDM circuits can be mapped across scheduled networks using one of the following methods:

1. Synchronous Method.
   In the Synchronous Method, all TDM circuits are synchronized to the scheduled network. For each TDM circuit, a specified number of TDM circuit bytes that occur in an integer number of 125 microsecond (μs) periods, are mapped into each scheduled packet. This method has been previously described in a patent application—entitled "Systems and Methods for the Emulation of TDM Circuits Over a Real-Time Scheduled Packet Network," Docket No. 21340/3, filed Mar. 7, 2002—which is incorporated herein by reference in its entirety.

2. Asynchronous Method.
   In the Asynchronous Method, each TDM circuit is allowed to be asynchronous relative to the scheduled network. Each TDM circuit is accumulated into a buffer for a provisionable amount of time (the Accumulation Interval), and the number of accumulated bits truncated to an integer number of bytes, (in all instances in this document, a byte refers to an 8-bit octet) are placed into each scheduled packet. The time of the Accumulation Interval is referenced to the scheduled network clock. Since the TDM circuits are not synchronized to the scheduled network, the number of bytes per scheduled packet is expected to vary by a small amount.

TDM circuits can be categorized into five categories:
1. The 24-channel Plesiochronous Digital Hierarchy, named because the primary interface, DS1, includes 24 individual 64 kbit/s payload channels.
2. The 30-channel Plesiochronous Digital Hierarchy, named because the primary interface, E1, includes 30 individual 64 kbit/s payload channels.
3. Synchronous Optical Network (SONET).
4. Synchronous Digital Hierarchy (SDH).
5. All other serial or parallel bit streams.

Table 1 and Table 2 list examples of these PDH, SONET, and SDH circuits, their interface rates, and examples of some payloads that each can transport. Many of these interfaces can have several different payload options, and all are candidates for the present invention.

TABLE 1

PDH Circuit Interfaces

| PDH Interface | TDM Interface Rate | Channelized Payload |
| --- | --- | --- |
| DS1 | 1.544 Mbps | 24 channels @ 64 kbps |
| DS1c | 3.152 Mbps | 2 DS1s |
| DS2 | 6.312 Mbps | 4 DS1s |
| DS3 | 44.736 Mbps | 7 DS2s |
| DS4NA | 139.264 Mbps | 3 DS3s |
| DS4 | 274.176 Mbps | 6 DS3s |
| E1 | 2.048 Mbps | 30 channels @ 64 kbps |
| E2 | 8.448 Mbps | 4 E1s |
| E3 | 34.368 Mbps | 4 E2s |
| E4 | 139.264 Mbps | 4 E3s |
| E5 | 565.148 Mbps | 4 E4s |

TABLE 2

SONET and SDH Circuit Interfaces

| SONET Interface | Full TDM Interface Rate | Synchronous Payload Envelope | Payload Capacity |
| --- | --- | --- | --- |
| OC-1 | 51.840 Mpbs | 50.112 Mpbs | 49.536 Mpbs |
| OC-3 | 155.520 Mpbs | 150.336 Mpbs | 149.760 Mpbs |
| OC-12 | 622.080 Mpbs | 601.344 Mpbs | 599.040 Mpbs |
| OC-48 | 2488.320 Mpbs | 2405.376 Mpbs | 2396.160 Mpbs |
| OC-192 | 9953.280 Mpbs | 9621.504 Mpbs | 9584.640 Mpbs |
| OC-768 | 39813.120 Mpbs | 38486.016 Mpbs | 38338.560 Mpbs |
| SDH Interface | Full TDM Interface Rate | Synchronous Payload Envelope | Payload Capacity |
| STM-1 | 155.520 Mpbs | 150.336 Mpbs | 149.760 Mbps |
| STM-4 | 622.080 Mpbs | 601.344 Mpbs | 599.040 Mbps |
| STM-16 | 2488.320 Mpbs | 2405.376 Mpbs | 2396.160 Mpbs |

TABLE 2-continued

SONET and SDH Circuit Interfaces

| STM-64 | 9953.280 Mpbs | 9621.504 Mpbs | 9584.640 Mpbs |
| STM-256 | 39813.120 Mpbs | 38486.016 Mpbs | 38338.560 Mpbs |

The descriptors for a TDM circuit schedule itinerary include the following:

Total number of appointments required for the TDM circuit.

Number of appointments for each scheduled IP packet.

In the Synchronous Method, the number of 125 microsecond (μs) TDM frames per scheduled IP packet (or the number of TDM payload bytes per scheduled IP packet).

In the Asynchronous Method, the Accumulation Interval, which is the time to accumulate an integer number of TDM circuit bytes into each scheduled packet.

Schedule efficiency across the scheduled IP network, which is the ratio of the original TDM circuit bit rate to the amount of bandwidth reserved by the total number of appointments in its itinerary over a scheduled packet network.

Bandwidth efficiency across the scheduled IP network, which is the ratio of the original TDM circuit bit rate to the bit rate of the scheduled packet, including IP and higher layer (e.g., UDP) overhead.

Packetization delay. This is the time required to accumulate TDM circuit bits into a packet.

It will be shown that for any TDM circuit, the formulas in the present invention offer several choices of scheduled packet sizes. If the formulas produce more than one choice, a choice is made by balancing schedule efficiency, bandwidth efficiency and packetization delay.

Circuit emulation represents one of the most difficult—if not the most difficult—service of any packet network. The circuit must appear as a bit stream with zero—near zero—packet loss, and zero—or near zero—jitter. Since an emulated circuit can support many applications, no inferences can be made by the packet network as to which application is operating. Therefore, only the strictest performance measures apply. An emulated TDM circuit on a Real-Time Scheduled Packet Network according to the invention has zero packet loss and zero jitter, offering the highest performance.

The method according to the present invention calculates the requisite descriptors of a scheduled IP itinerary for an emulated TDM circuit, given virtually any TDM bit rate. Such a scheduled IP itinerary can be as described in U.S. patent application Ser. No. 09/746,744, filed Dec. 22, 2000, entitled "Scheduled Network Packet Switch," which is incorporated herein by reference in its entirety.

BRIEF DESCRIPTION OF THE DRAWINGS

The foregoing and other features and advantages of the present invention will be more fully understood by the following detailed description of illustrative embodiments taken in conjunction with the accompanying drawings in which.

DETAILED DESCRIPTION OF THE INVENTION

Figure 1:
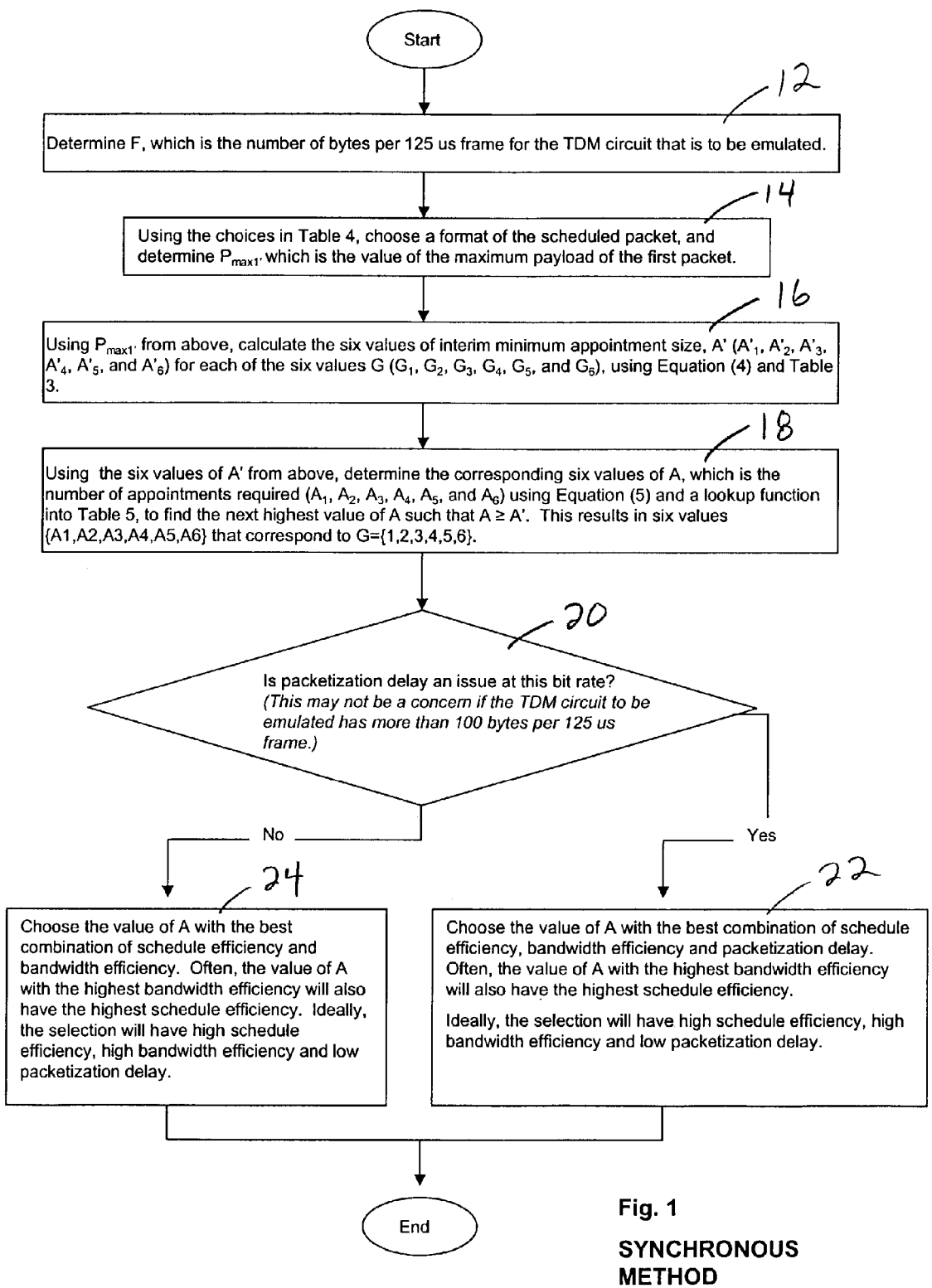
FIG. 1 is a process flow diagram for determining the minimum required number of appointments for any TDM circuit according to a specific synchronous method of at least one illustrative embodiment of the present invention.

The following sections describe specific illustrative embodiments (Section I) of a synchronous (Section IA) and asynchronous (Section IB) implementation according to the invention, based on certain applicable assumptions (as specified preceding the pertinent Sections). The specific implementations describe synchronous and asynchronous embodiments based on a specific schedule interval (20 ms) and specific appointment size (250 bytes). One skilled in the art will appreciate that the specific illustrative embodiments are only illustrative of the invention which has more general applicability.

General illustrative embodiments are also described (Section II). The general illustrative embodiments or methodology demonstrate a detailed synchronous method for any schedule interval and appointment size (Section IIA) and two derived embodiments including one (Section IIB) with a specific schedule interval (20 ms) and specific appointment size (250 bytes) that is the same as the specific synchronous implementation described in Section IA. The second synchronous derived embodiment (Section IIC) has a different specific schedule interval (120 ms) and specific appointment size (50 bytes), which demonstrates the general applicability of the systems and methods according to the invention. A generalized asynchronous system and method is also described (Section IID) for any schedule interval and appointment size. First and second derived asynchronous embodiments are also presented including one (Section IIE) with a specific schedule interval (20 ms) and specific appointment size (250 bytes) that is the same as the specific asynchronous implementation described in Section IB. The second asynchronous derived embodiment (Section IIF) has a different specific schedule interval (120 ms) and specific appointment size (50 bytes), which, again, demonstrates the general applicability of the systems and methods according to the invention.

I. Specific Illustrative Embodiments

In a specific implementation, there are several variables to be considered for mapping TDM circuits into scheduled IP packets, including the packet protocols, the size of the packet, and the boundaries between packets. The assumptions for the formulas given in the following Specific Illustrative embodiment sections are as follows:

1. The schedule interval (cycle time of appointments) is assumed to be 20 milliseconds (ms).
2. The appointment size is assumed fixed on all links at 2000 bits, which is also equal to 250 bytes.
3. It is assumed that TDM circuits are converted to scheduled UDP/IP packets. The packets can then be transported over Ethernet, SONET, or any other type of network media formats. Since Ethernet has more frame overhead than Packet-over-SONET and other Optical mappings, it represents the worst case. The calculations shown in the present invention assume that Ethernet transport is a possible media for the scheduled packets, and the maximum payload is adjusted accordingly for this worst case. It is straightforward to adjust this maximum payload by using media other than Ethernet.

4. Packet Payloads.
   a. For the synchronous method, each scheduled IP packet should contain an integer number of 125 μs TDM frames for TDM circuits less than 91 Mbps. DS3 TDM frames are unique in that they do not repeat every 125 μs, but a DS3 does represent an integer number of bytes every 125 μs. Individual DS0s do not have a frame; they represent a single byte every 125 μs. DS1s have a 193-bit frame every 125 μs, which is not an integer number of bytes; therefore, an optimal DS1 solution should convert every N×8 frames into a scheduled IP packet. For TDM circuit speeds higher than 91 Mbps, each scheduled IP packet should contain a fraction of a 125 μs TDM frame. This is intended to simplify the packetization design and timing recovery.
   b. For the asynchronous method, each scheduled IP packet can contain any number of bytes, subject to the maximum packet size in Assumption 5, below.

5. A maximum sized packet on Ethernet (1538 bytes including the minimum interframe gap of 12 bytes), requires seven 250-byte appointments, but only a small fraction of the 7$^{th}$ appointment is used. The maximum IP packet size should span at most 6 appointments; the limit of 6 appointments per scheduled IP packet helps to keep schedule efficiency high for TDM circuits over IP. Therefore, the packet should be no larger than 1500 bytes including Ethernet overhead (and Ethernet's 12-byte minimum interframe gap), or 1462 bytes including all overhead except Ethernet. Assuming a 250-byte appointment size, the possible number of appointments per packet is therefore 1, 2, 3, 4, 5, or 6.

It should be appreciated by those skilled in the art that other assumptions may be made in using the formulas as a function of the application. More specifically, other assumptions may be made based on different network configurations (i.e. other than Ethernet), and timing considerations. For example, the appointment size could be other than 250 bytes; that affects the method by changing the values for the maximum payload in a scheduled packet, which will be shown in Table 3. Another example could be a schedule interval other than 20 ms; this would simply change the ratio of Schedule interval to 125 μs frame time, from 160 to another number.

IA. Specific Illustrative Embodiment of the Synchronous Method

The key starting formula for the Synchronous Method is found by matching the number of TDM circuit bytes in a 20 ms schedule interval with the number of payload bytes in a scheduled itinerary in the same 20 ms.

$$F \times 160 = \frac{A \times P}{G} \quad (1)$$

F is the number of TDM bytes in a 125 μs frame.
A is the number of appointments in the scheduled IP itinerary.
P is the size of each scheduled IP packet payload, in bytes. The IP packet payload does not include any overhead bytes for RTP, UDP, IP, or Ethernet.
G is the group of appointments that each packet requires. $G \in \{1,2,3,4,5,6\}$.
160 is the ratio of the schedule interval (20 ms) to the TDM frame interval (125 μs. For other schedule intervals or TDM frame intervals, enter the ratio of the schedule interval to the TDM frame interval. F should then represent the number of bytes in this TDM frame interval.

Solving for A, we get:

$$A = \frac{F \times G \times 160}{P} \quad (2)$$

It is known from Assumption 4a that the size of each scheduled IP packet payload is an integer number of bytes in a 125 μs TDM frame. Substituting this into Equation (1), results in:

$$A = \frac{G \times 160}{N} \quad (3)$$

N is the number of 125 μs TDM frames in each scheduled IP packet.

There are two additional constraints that can be placed on Equation (3) to converge on a solution. First, there is a minimum number of appointments per schedule interval (A) required, based on the number of TDM frames to be mapped and packet size. Second, both A and N must be integers, so a lookup function can be used to determine the final values of A and N, for each of the 6 possibilities of G, for any TDM signal. These methods are described in the following paragraphs.

There are two conditions that set the minimum number of appointments required; there must be at least the number of appointments taken up by a packet (group size, G), and for each group size there is a maximum packet payload size, $P_{max}$ that also sets a minimum number of appointments per schedule interval, A'. The term A' is used because this is an interim value which is used to determine the actual minimum number of appointments required.

$$\text{For } i = \{1:6\}, A'_i = \max\left(G_i, \frac{F \times G_i \times 160}{P_{max\,i}}\right) \text{ or specifically,} \quad (4)$$

$$A'_1 = \max\left(1, \frac{F \times 160}{P_{max\,1}}\right)$$

$$A'_2 = \max\left(2, \frac{F \times 320}{P_{max\,2}}\right)$$

$$A'_4 = \max\left(4, \frac{F \times 640}{P_{max\,4}}\right)$$

$$A'_5 = \max\left(5, \frac{F \times 800}{P_{max\,5}}\right)$$

$$A'_6 = \max\left(6, \frac{F \times 960}{P_{max\,6}}\right)$$

The maximum packet payload size ($P_{max}$) for each of the six group sizes of appointments depends on the format chosen for scheduled packet transport. It has already been assumed, for calculation purposes, that packets should be sized so that transport over Ethernet networks is allowed. There are three optional header fields that should be considered:

1. Ethernet has an optional 4-byte Virtual LAN (VLAN) header.
2. The Real Time Protocol (RTP) can be used, which provides time stamping and sequencing. RTP might benefit the performance through a Scheduled IP network, or it could be chosen for compatibility with mappings over non-scheduled packet networks. The RTP overhead field is 12 bytes, if present.
3. Another optional overhead can be included for TDM Control. This field can indicate conventional circuit conditions such as Loss of Signal, Remote Defect, or Alarm Indication Signal (AIS), but the details of this field are outside the scope of the present invention. The TDM Control field could be any size, but a field of 4 bytes is assumed if it is present.

Table 3 and Table 4 show the maximum capacity of TDM payload per scheduled packet ($P_{max}$) for each of the six appointment group sizes. Ethernet, IP, and UDP represent 38, 20, and 8 bytes of overhead, respectively, totaling 66 bytes. [$VLAN_4$] refers to the 4-byte VLAN field, if present. [$RTP_{12}$] refers to the 12-byte RTP field, if present. [$TDMC_4$] refers to the 4-byte TDM Control field, if present.

TABLE 3

Maximum Packet Payloads ($P_{max}$) vs.
Appointment Groups per Packet (G)

| G | $P_{max}$ (in Bytes) |
|---|---|
| 1 | $P_{max1}$ = (250 − 66) − [$VLAN_4$] − [$RTP_{12}$] − [$TDMC_4$] |
| 2 | $P_{max2}$ = $P_{max1}$ + 250 |
| 3 | $P_{max3}$ = $P_{max2}$ + 250 |
| 4 | $P_{max4}$ = $P_{max3}$ + 250 |
| 5 | $P_{max5}$ = $P_{max4}$ + 250 |
| 6 | $P_{max6}$ = $P_{max5}$ + 250 |

TABLE 4

Maximum Payload ($P_{max1}$) of A Single Appointment Packet

| VLAN Header | RTP Header | TDM Control Header | Resulting $P_{max1}$ |
|---|---|---|---|
| None | None | None | 184 Bytes |
| None | None | 4 Bytes | 180 Bytes |
| None | 12 Bytes | None | 172 Bytes |
| None | 12 Bytes | 4 Bytes | 168 Bytes |
| 4 Bytes | None | None | 180 Bytes |
| 4 Bytes | None | 4 Bytes | 176 Bytes |
| 4 Bytes | 12 Bytes | None | 168 Bytes |
| 4 Bytes | 12 Bytes | 4 Bytes | 164 Bytes |

As previously noted, A, G, and N must all be integers. Since Assumption 5 limits the group size (G) to 6 appointments, there are only six possible values for G. Equation (3) can now be simplified for the six possible instances of G:

$$G = 1 : A_1 = \frac{160}{N_1} \quad (5)$$

$$G = 2 : A_2 = \frac{320}{N_2}$$

$$G = 3 : A_3 = \frac{480}{N_3}$$

$$G = 4 : A_4 = \frac{640}{N_4}$$

$$G = 5 : A_5 = \frac{800}{N_5}$$

$$G = 6 : A_6 = \frac{960}{N_6}$$

There are only a finite number of integers that can satisfy the set of equations in (5) above. Table 5 shows these possible values for {$A_1$:$A_6$} and {$N_1$:$N_6$}. The highest number of appointments that can be used with this technique is 960, which limits the speed of each TDM circuit to about 960×250 bytes every 20 ms, or approximately 96 Mbps or less, depending on the chosen packet format. Those skilled in the art can easily modify the above equations to allow scheduled packets to contain fractions of TDM frames for higher-speed TDM circuits.

TABLE 5

Possible Integer Values of A and N

| G = 1 | | G = 2 | | G = 3 | | G = 4 | | G = 5 | | G = 6 | |
|---|---|---|---|---|---|---|---|---|---|---|---|
| $A_1$ | $N_1$ | $A_2$ | $N_2$ | $A_3$ | $N_3$ | $A_4$ | $N_4$ | $A_5$ | $N_5$ | $A_6$ | $N_6$ |
| 1 | 160 | 1 | 320 | 1 | 480 | 1 | 640 | 1 | 800 | 1 | 960 |
| 2 | 80 | 2 | 160 | 2 | 240 | 2 | 320 | 2 | 400 | 2 | 480 |
| 4 | 40 | 4 | 80 | 3 | 160 | 4 | 160 | 4 | 200 | 3 | 320 |
| 5 | 32 | 5 | 64 | 4 | 120 | 5 | 128 | 5 | 160 | 4 | 240 |
| 8 | 20 | 8 | 40 | 5 | 96 | 8 | 80 | 8 | 100 | 5 | 192 |
| 10 | 16 | 10 | 32 | 6 | 80 | 10 | 64 | 10 | 80 | 6 | 160 |
| 16 | 10 | 16 | 20 | 8 | 60 | 16 | 40 | 16 | 50 | 8 | 120 |
| 20 | 8 | 20 | 16 | 10 | 48 | 20 | 32 | 20 | 40 | 10 | 96 |
| 32 | 5 | 32 | 10 | 12 | 40 | 32 | 20 | 25 | 32 | 12 | 80 |
| 40 | 4 | 40 | 8 | 15 | 32 | 40 | 16 | 32 | 25 | 15 | 64 |
| 80 | 2 | 64 | 5 | 16 | 30 | 64 | 10 | 40 | 20 | 16 | 60 |
| 160 | 1 | 80 | 4 | 20 | 24 | 80 | 8 | 50 | 16 | 20 | 48 |
| | | 160 | 2 | 24 | 20 | 128 | 5 | 80 | 10 | 24 | 40 |
| | | 320 | 1 | 30 | 16 | 160 | 4 | 100 | 8 | 30 | 32 |
| | | | | 32 | 15 | 320 | 2 | 160 | 5 | 32 | 30 |
| | | | | 40 | 12 | 640 | 1 | 200 | 4 | 40 | 24 |
| | | | | 48 | 10 | | | 400 | 2 | 48 | 20 |

TABLE 5-continued

Possible Integer Values of A and N

| G = 1 | | G = 2 | | G = 3 | | G = 4 | | G = 5 | | G = 6 | |
|---|---|---|---|---|---|---|---|---|---|---|---|
| $A_1$ | $N_1$ | $A_2$ | $N_2$ | $A_3$ | $N_3$ | $A_4$ | $N_4$ | $A_5$ | $N_5$ | $A_6$ | $N_6$ |
| | | | | 60 | 8 | | | 800 | 1 | 60 | 16 |
| | | | | 80 | 6 | | | | | 64 | 15 |
| | | | | 96 | 5 | | | | | 80 | 12 |
| | | | | 120 | 4 | | | | | 96 | 10 |
| | | | | 160 | 3 | | | | | 120 | 8 |
| | | | | 240 | 2 | | | | | 160 | 6 |
| | | | | 480 | 1 | | | | | 192 | 5 |
| | | | | | | | | | | 240 | 4 |
| | | | | | | | | | | 320 | 3 |
| | | | | | | | | | | 480 | 2 |
| | | | | | | | | | | 960 | 1 |

Packetization delay (Pack_Delay) is proportional to the number of 125 μs TDM frames in each scheduled IP packet:

$$\text{Pack\_Delay} = N \times 125 \text{ μs} \quad (6)$$

The schedule efficiency (Sched_Eff) of an emulated TDM circuit refers to the ratio of the original TDM circuit bit rate to the amount of bandwidth reserved by the total number of appointments in its itinerary over a scheduled packet network. This also equates to the number of TDM circuit bytes in a schedule interval (a 20 ms schedule interval=160 TDM frames @ 125 μs) divided by the number of reserved appointment bytes in that schedule interval. The TDM circuit bit rate is represented by the number of bytes per 125 μs TDM frame (F).

$$\text{Sched\_Eff} = \frac{F \times 160}{A \times 250} = \frac{0.64 \times F}{A} \quad (7)$$

The Bandwidth Efficiency across the scheduled IP network is the ratio of the original TDM circuit bit rate to the bit rate of the scheduled packet, including IP and higher layer (e.g., UDP) overhead. Alternatively, the Bandwidth Efficiency is the ratio of packet payload to overall packet size (including IP and higher overhead). The Bandwidth Efficiency (BW_Eff) can be calculated by the following equation:

$$\text{BW\_Eff} = \frac{N \times F}{N \times F + [TDMC_4] + [RTP_{12}] + [VLAN_4] + 28} \quad (8)$$

[$TDMC_4$] refers to the 4-byte TDM Control field, and assumed equal to 4 if present, else 0.

[$RTP_{12}$] refers to the 12-byte RTP field, and is equal to 12 if present, else 0.

[$VLAN_4$] refers to the 4-byte VLAN field, and is equal to 4 if present, else 0.

The number 28 represents the number of overhead bytes in IP (20 bytes) and UDP (8 bytes).

Delay and Efficiency Considerations

Equations (1) through (8) in the previous section may result in up to 6 possible configurations of the total number of Appointments per schedule interval (A), the number of TDM frames per IP packet (F), and group of appointments per packet (G). Although it is usually best to choose the configuration with the minimum number of appointments, it may be preferable to choose a configuration with less packetization delay.

Consider the E1 circuit, which is used extensively outside of the U.S. The E1 bit rate, including overhead, is 2.048 Mbps. Therefore F=32 bytes every 125 μs. Equations (4), (5), (6), and (7) are then used to calculate the values shown in Table 6, below. To keep the number of possibilities to a minimum, the values in Table 7 were calculated assuming that the RTP header and TDM Control header are used, but not the VLAN header. As previously noted, other header combinations can easily be used, which may alter the results.

Although there are two resulting configurations in Table 7 that have the highest Schedule Efficiency (G=3 and G=6), the former has much less packetization delay and is therefore the better choice. If packetization delay needs to be lower, G=1 or G=2 may be the better choices.

Examples of common TDM circuits are shown in the table below. Note that the high speed of OC-3/STM-1 limits the conversion to ½ of the bytes in each TDM frame.

TABLE 6

Examples of TDM Circuit Mappings - Synchronous Method
Cells in the table containing "—" indicate no solution for that packet size.

| Circuit | TDM Bit Rate | F | G | A' | A × N | A | N | Schedule Efficiency | Bandwidth Efficiency | Packetization Delay |
|---|---|---|---|---|---|---|---|---|---|---|
| DS1 | 1.544 Mbps | 24.125 Bytes | 1 | 22.44 | 160 | 32 | 5 | 48.3% | 73.3% | 0.6 ms |
| | | | 2 | 18.29 | 320 | 20 | 16 | 77.2% | 89.8% | 2.0 ms |
| | | | 3 | 17.23 | 480 | 20 | 24 | 77.2% | 92.9% | 3.0 ms |

TABLE 6-continued

Examples of TDM Circuit Mappings - Synchronous Method
Cells in the table containing "—" indicate no solution for that packet size.

| Circuit | TDM Bit Rate | F | G | A' | A × N | A | N | Schedule Efficiency | Bandwidth Efficiency | Packetization Delay |
|---|---|---|---|---|---|---|---|---|---|---|
| | | | 4 | 16.75 | 640 | 20 | 32 | 77.2% | 94.6% | 4.0 ms |
| | | | 5 | 16.47 | 800 | 20 | 40 | 77.2% | 95.6% | 5.0 ms |
| | | | 6 | 16.29 | 960 | 20 | 48 | 77.2% | 96.3% | 6.0 ms |
| E1 | 2.048 Mbps | 32 Bytes | 1 | 29.77 | 160 | 32 | 5 | 64.0% | 78.4% | 0.6 ms |
| | | | 2 | 24.27 | 320 | 32 | 10 | 64.0% | 87.9% | 1.3 ms |
| | | | 3 | 22.86 | 480 | 24 | 20 | 85.3% | 93.6% | 2.5 ms |
| | | | 4 | 22.21 | 640 | 32 | 20 | 64.0% | 93.6% | 2.5 ms |
| | | | 5 | 21.84 | 800 | 25 | 32 | 81.9% | 95.9% | 4.0 ms |
| | | | 6 | 21.60 | 960 | 24 | 40 | 85.3% | 96.7% | 5.0 ms |
| E3 | 34.368 Mbps | 537 Bytes | 1 | 499.53 | 160 | — | — | — | — | — |
| | | | 2 | 407.20 | 320 | — | — | — | — | — |
| | | | 3 | 383.57 | 480 | 480 | 1 | 71.6% | 92.4% | 0.1 ms |
| | | | 4 | 372.75 | 640 | 640 | 1 | 53.7% | 92.4% | 0.1 ms |
| | | | 5 | 366.55 | 800 | 400 | 2 | 85.9% | 96.1% | 0.3 ms |
| | | | 6 | 362.53 | 960 | 480 | 2 | 71.6% | 96.1% | 0.3 ms |
| DS3 | 44.736 Mbps | 699 Bytes | 1 | 650.23 | 160 | — | — | — | — | — |
| | | | 2 | 530.05 | 320 | — | — | — | — | — |
| | | | 3 | 499.29 | 480 | — | — | — | — | — |
| | | | 4 | 485.21 | 640 | 640 | 1 | 69.9% | 94.1% | 0.1 ms |
| | | | 5 | 477.13 | 800 | 800 | 1 | 55.9% | 94.1% | 0.1 ms |
| | | | 6 | 471.90 | 960 | 480 | 2 | 93.2% | 96.9% | 0.3 ms |
| EC-1 (STS-1) | 51.840 Mbps | 810 Bytes | 1 | 753.49 | 160 | — | — | — | — | — |
| | | | 2 | 614.22 | 320 | — | — | — | — | — |
| | | | 3 | 578.57 | 480 | — | — | — | — | — |
| | | | 4 | 562.26 | 640 | 640 | 1 | 81.0% | 94.8% | 0.1 ms |
| | | | 5 | 552.90 | 800 | 800 | 1 | 64.8% | 94.8% | 0.1 ms |
| | | | 6 | 546.84 | 960 | 960 | 1 | 54.0% | 94.8% | 0.1 ms |
| OC-3/ STM-1 | 155.520 Mbps | 2430 Bytes | 1 | 2260.47 | 160 | — | — | — | — | — |
| | | | 2 | 1842.65 | 320 | — | — | — | — | — |
| | | | 3 | 1735.71 | 480 | — | — | — | — | — |
| | | | 4 | 1686.77 | 640 | — | — | — | — | — |
| | | | 5 | 1658.70 | 800 | — | — | — | — | — |
| | | | 6 | 1640.51 | 960 | 1920 | 0.5 | 81.0% | 96.5% | 0.1 ms |

TABLE 7

Example: E1 Circuit Examples - Synchronous Method

| G | A' | A × N | A | N | Schedule Efficiency | Bandwidth Efficiency | Packetization Delay |
|---|---|---|---|---|---|---|---|
| 1 | 30.48 | 160 | 32 | 5 | 64.0% | 78.4% | 0.6 ms |
| 2 | 24.50 | 320 | 32 | 10 | 64.0% | 87.9% | 1.3 ms |
| 3 | 22.99 | 480 | 24 | 20 | 85.3% | 93.6% | 2.5 ms |
| 4 | 22.31 | 640 | 32 | 20 | 64.0% | 93.6% | 2.5 ms |
| 5 | 21.92 | 800 | 25 | 32 | 81.9% | 95.9% | 4.0 ms |
| 6 | 21.66 | 960 | 24 | 40 | 85.3% | 96.7% | 5.0 ms |

Those skilled in the art now have enough information to determine the minimum required number of appointments for any TDM circuit. The steps to process are shown in FIG. 1 for the synchronous method.

First, the number of bytes per 125 μs frame is determined 12. Next, a format of the scheduled packet is chosen 14 and the value of the maximum payload of the first packet is determined. Then, six values of interim minimum appointment size (A') are calculated 16 for each of the six values of appointment groups per packet (G). Six values of the number of appointments required (A) are then determined 18 corresponding to G={1,2,3,4,5,6}.

Packetization delay is then considered 20. If packetization delay is an issue at this bit rate 22, then a value for the number of appointments required (A) is chosen with the best combination of schedule efficiency, bandwidth efficiency and packetization delay.

If packetization delay is not an issue at this bit rate 24, then a value for the number of appointments required (A) is chosen with the best combination of schedule efficiency and bandwidth efficiency.

IB. Specific Illustrative Embodiment of the Asynchronous Method

In the Asynchronous Method, TDM circuits are no longer synchronized to the scheduled network. One can theoretically choose any Accumulation Interval to accumulate bytes from TDM circuits into scheduled packets; the only restrictions are:

1. The number of accumulated bytes in the Accumulation Interval must be less than a defined maximum. Practical considerations of schedule efficiency usually set the maximum number of accumulated bytes per packet equal to the maximum payload of 6 appointments.
2. The resulting number of appointments must be within the capacity of the scheduled network. Practically, This restriction only applies to TDM circuits that have similar or higher bit rates than interfaces on the scheduled network.

There is a more practical method than having an infinitely adjustable Accumulation Interval. For constant bit rate flows such as emulated TDM circuits, there are a constant number of packets per schedule interval. The Asynchronous. Method calculates the minimum number of packets per schedule interval, which is limited by the maximum TDM circuit bit rate (relative to the scheduled network) and the maximum scheduled packet size.

Although TDM circuits have a constant bit rate, the Asynchronous Method assumes that the TDM circuit is not synchronized to the scheduled network. Therefore, the maximum TDM circuit bit rate relative to the scheduled network is calculated by using the following formula:

$$TDM\_BR_{max} = TDM\_BR_{nom} \times \left[1 + \left(\frac{\Delta TDM\_Clock_{max} + \Delta Accum\_Clock_{max}}{1000000}\right)\right] \quad (9)$$

$TDM\_BR_{max}$ is the maximum bit rate of the TDM circuit, in bits/sec, with respect to the Accumulator clock.

$TDM\_BR_{nom}$ is the nominal bit rate of the TDM circuit, in bits/sec, with respect to the Accumulator clock.

$\Delta TDM\_Clock_{max}$ is the maximum frequency drift of the TDM circuit clock, in parts per million (ppm). For example, if the accuracy of the TDM clock is ±50 ppm, then $\Delta TDM\_Clock_{max}=50$.

$\Delta Accum\_Clock_{max}$ is the maximum frequency drift of the Accumulator clock, in parts per million (ppm).

The minimum number of packets per schedule interval is calculated by using the following formula:

$$K_{min} = \text{Roundup}\left[\frac{TDM\_BR_{max} \times 20 \text{ ms}}{P_{max} \times 8}\right] \quad (10)$$

Roundup is a function(x) that rounds up the value "x" to the next highest integer that is greater than or equal to x.

$K_{min}$ is the minimum number of packets per 20 millisecond (ms) Schedule Interval.

$P_{max}$ is the maximum payload per scheduled packet (in bytes). $P_{max}$ depends on the specific packet formats chosen, and the maximum frame size on the scheduled network. We have previously used the assumption that Ethernet will limit packet sizes to 1500 bytes, excluding Ethernet overhead. IP and UDP add 20 bytes and 8 bytes of overhead to the packet size, respectively, resulting in a maximum packet size of 1500−28=1472 bytes, if there is no other overhead.

The maximum packet payload is shown in Table 8 below for several possible packet formats. The values in Table 8 are not the only choices; those skilled in the art will recognize that other combinations are possible, especially with the TDM control header, which can be virtually any size.

TABLE 8

Maximum Payload of A Scheduled Packet ($P_{max}$)

| VLAN Header | RTP Header | TDM Control Header | Resulting $P_{max}$ |
|---|---|---|---|
| None | None | None | 1472 Bytes |
| None | None | 4 Bytes | 1468 Bytes |
| None | 12 Bytes | None | 1460 Bytes |
| None | 12 Bytes | 4 Bytes | 1456 Bytes |
| 4 Bytes | None | None | 1468 Bytes |
| 4 Bytes | None | 4 Bytes | 1464 Bytes |
| 4 Bytes | 12 Bytes | None | 1456 Bytes |
| 4 Bytes | 12 Bytes | 4 Bytes | 1452 Bytes |

Once $K_{min}$ is calculated, larger values K (number of packets per schedule interval) can be chosen to optimize the following parameters:

Schedule Efficiency

Bandwidth Efficiency

Packetization Delay (also equal to the Accumulation Interval)

Before the above optimization parameters are calculated, other important parameters should be calculated for each value of K:

Maximum Expected Packet Size

Required Number of Appointments

The Maximum Expected Packet Size (MEPS), in bytes, is calculated by the following equation:

$$MEPS = \text{Roundup}\left[\frac{TDM\_BR_{max} \times SI}{8 \times K}\right] + [TDMC_4] + [RTP_{12}] + [VLAN_4] + 66 \text{ or, given a Schedule Interval}(SI) \text{ of } 20 \text{ ms}(0.02 \text{ sec}), \quad (11)$$

$$MEPS = \text{Roundup}\left[\frac{TDM\_BR_{max}}{400 \times K}\right] + [TDMC_4] + [RTP_{12}] + [VLAN_4] + 66$$

[$TDMC_4$] refers to the 4-byte TDM Control field, and assumed equal to 4 if present, else 0.

[$RTP_{12}$] refers to the 12-byte RTP field, and is equal to 12 if present, else 0.

[$VLAN_4$] refers to the 4-byte VLAN field, and is equal to 4 if present, else 0.

The number 66 represents the total number of overhead bytes from UDP (8 bytes), IP (20 bytes), and Ethernet (38 bytes, including Ethernet's 12-byte minimum interframe gap).

The total number of appointments required for the scheduled IP itinerary is calculated using the Maximum Expected Packet Size and the number of packets per Schedule Interval (K), as shown in Table 9. The size of the packet in Table 9 includes UDP/IP overhead, Ethernet overhead (including the 12-byte minimum interframe gap between Ethernet frames), and any of the optional headers shown in Table 8 (VLAN, RTP, and TDM Control Headers).

TABLE 9

Appointments

| Maximum Expected Packet Size (Including All Overhead and Ethernet Interframe Gap) | Number of Appointments Required per Packet | Total Number of Appointments Required per Itinerary (A) |
|---|---|---|
| [1–250] bytes | 1 | K |
| [251–500] bytes | 2 | 2K |
| [501–750] bytes | 3 | 3K |
| [751–1000] bytes | 4 | 4K |
| [1001–1250] bytes | 5 | 5K |
| [1251–1500] bytes | 6 | 6K |
| [1501–1538] bytes or [1501–1542] bytes The maximum size packet on Ethernet is 1538 bytes if there is no VLAN tag, and 1542 bytes with a VLAN tag. | 7 Packet sizes should be limited to 6 appointments to keep schedule efficiency high, as per Assumption 5. | 7K |

The Schedule Efficiency is the ratio of the original TDM circuit bit rate to the amount of bandwidth reserved by the total number of appointments in its itinerary over a scheduled packet network. The Schedule Efficiency (Sched_Eff) can be calculated by the following equation:

$$\text{Sched\_Eff} = \frac{\text{TDM\_BR}_{nom} \times SI}{\text{Appt\_Size} \times A} \quad (12)$$

or, given an appointment size of 250 bytes (2000 bits and a Schedule Interval(SI) of 20 ms(0.02 sec), $$\text{Sched\_Eff} = \frac{\text{TDM\_BR}_{nom}}{100000 \times A}$$

The Bandwidth Efficiency across the scheduled IP network is the ratio of the original TDM circuit bit rate to the bit rate of the scheduled packet, including IP and higher layer (e.g., UDP) overhead. The Bandwidth Efficiency (BW_Eff) can be calculated by the following equation:

$$\text{BW\_Eff} = \frac{\text{TDM\_BR}_{nom} \times SI}{\text{TDM\_BR}_{nom} \times SI + ([TDMC_4] + [RTP_{12}] + [VLAN_4] + 28) \times 8 \times K} \quad (13)$$

or, given a Schedule Interval(SI) of 20 ms(0.02 sec), $$\text{BW\_Eff} = \frac{\text{TDM\_BR}_{nom}}{\text{TDM\_BR}_{nom} + ([TDMC_4] + [RTP_{12}] + [VLAN_4] + 28) \times 400 \times K}$$

The number 28 represents the number of overhead bytes in IP (20 bytes) and UDP (8 bytes).

The Packetization Delay is the same as the Accumulation Interval, and can be calculated using the number of packets per schedule interval:

$$\text{Packetization\_Delay} = \text{Accumulation\_Interval} = \frac{SI}{K} \quad (14)$$

or, given a Schedule Interval(SI) of 20 ms(0.02 sec), $$\text{Packetization\_Delay} = \text{Accumulation\_Interval} = \frac{20 \text{ ms}}{K}$$

Consider again the E1 circuit, 2.048 Mbps, where the entire E1 bit rate—including TDM overhead—is mapped into scheduled packets. A table of possible values can be created, once the clock accuracies are known and the packet format is chosen. Two assumptions will be made to proceed with the example; however, the present method can be used with any clock accuracies or packet formats:

Assume $\Delta\text{TDM\_Clock}_{max} + \Delta\text{Accum\_Clock}_{max} = 150$ ppm Assume the Packet format includes a 12-byte RTP header, a 4-byte TDM Control header, and no VLAN header.

Using Table 8, $P_{max}$ is equal to 1456 bytes. Using Equation (9), $K_{min}$ (the minimum number of packets per Schedule Interval), is equal to 4. A table of parameters can now be created using various values of K ($K \geq K_{min}$) using Equations (10) through (13), as shown in Table 10.

TABLE 10

Example Schedule Parameters for E1 Circuits, Asynchronous Method

| Packets per Schedule Interval (K) | Max Expected Packet Size | Appts. per Packet | Total Appts. (A) | Schedule Efficiency | Bandwidth Efficiency | Packetization Delay |
|---|---|---|---|---|---|---|
| 4 | 1363 bytes | 6 | 24 | 85.3% | 96.7% | 5.00 ms |
| 5 | 1107 bytes | 5 | 25 | 81.9% | 95.9% | 4.00 ms |
| 6 | 936 bytes | 4 | 24 | 85.3% | 95.1% | 3.33 ms |
| 7 | 814 bytes | 4 | 28 | 73.1% | 94.3% | 2.86 ms |
| 8 | 723 bytes | 3 | 24 | 85.3% | 93.6% | 2.50 ms |
| 9 | 651 bytes | 3 | 27 | 75.9% | 92.8% | 2.22 ms |
| 10 | 595 bytes | 3 | 30 | 68.3% | 92.1% | 2.00 ms |
| 11 | 548 bytes | 3 | 33 | 62.1% | 91.4% | 1.82 ms |
| 12 | 509 bytes | 3 | 36 | 56.9% | 90.7% | 1.67 ms |
| 13 | 476 bytes | 2 | 26 | 78.8% | 90.0% | 1.54 ms |
| 14 | 448 bytes | 2 | 28 | 73.1% | 89.3% | 1.43 ms |
| 15 | 424 bytes | 2 | 30 | 68.3% | 88.6% | 1.33 ms |
| 16 | 403 bytes | 2 | 32 | 64.0% | 87.9% | 1.25 ms |
| 17 | 384 bytes | 2 | 34 | 60.2% | 87.3% | 1.18 ms |
| 18 | 367 bytes | 2 | 36 | 56.9% | 86.6% | 1.11 ms |
| 19 | 352 bytes | 2 | 38 | 53.9% | 86.0% | 1.05 ms |
| 20 | 339 bytes | 2 | 40 | 51.2% | 85.3% | 1.00 ms |
| 21 | 326 bytes | 2 | 42 | 48.8% | 84.7% | 0.95 ms |
| 22 | 315 bytes | 2 | 44 | 46.5% | 84.1% | 0.91 ms |
| 23 | 305 bytes | 2 | 46 | 44.5% | 83.5% | 0.87 ms |
| 24 | 296 bytes | 2 | 48 | 42.7% | 82.9% | 0.83 ms |
| 25 | 287 bytes | 2 | 50 | 41.0% | 82.3% | 0.80 ms |
| 26 | 279 bytes | 2 | 52 | 39.4% | 81.7% | 0.77 ms |
| 27 | 272 bytes | 2 | 54 | 37.9% | 81.2% | 0.74 ms |
| 28 | 265 bytes | 2 | 56 | 36.6% | 80.6% | 0.71 ms |
| 29 | 259 bytes | 2 | 58 | 35.3% | 80.1% | 0.69 ms |
| 30 | 253 bytes | 2 | 60 | 34.1% | 79.5% | 0.67 ms |
| 31 | 248 bytes | 1 | 31 | 66.1% | 79.0% | 0.65 ms |
| 32 | 243 bytes | 1 | 32 | 64.0% | 78.4% | 0.63 ms |
| 33 | 238 bytes | 1 | 33 | 62.1% | 77.9% | 0.61 ms |
| 34 | 233 bytes | 1 | 34 | 60.2% | 77.4% | 0.59 ms |
| 35 | 229 bytes | 1 | 35 | 58.5% | 76.9% | 0.57 ms |

It is now a simple matter of choosing the value of K with the best Schedule Efficiency and Bandwidth Efficiency that meets the customer's delay requirements.

Several more examples are shown below for other common TDM circuits. The Asynchronous Method is in no way limited to the values shown.

E1 mappings were shown in Table 10 for the asynchronous method. Note that many more combinations are possible than are shown in Table 11 below.

TABLE 11

Examples of TDM Circuit Mappings - Asynchronous Method

| TDM Circuit Bit Rate to be Scheduled | Packets per Schedule Interval | Maximum Expected Packet Size | Appts. per Packet | Total Appts. | Schedule Efficiency | Bandwidth Efficiency | Packetization Delay |
|---|---|---|---|---|---|---|---|
| DS-1 1,544 Mbps | 3 | 1369 bytes | 6 | 18 | 85.8% | 96.7% | 6.67 ms |
| | 4 | 1048 bytes | 5 | 20 | 77.2% | 95.6% | 5.00 ms |
| | 5 | 855 bytes | 4 | 20 | 77.2% | 94.6% | 4.00 ms |
| | 6 | 726 bytes | 3 | 18 | 85.8% | 93.6% | 3.33 ms |
| | 7 | 634 bytes | 3 | 21 | 73.5% | 92.6% | 2.86 ms |
| | 8 | 565 bytes | 3 | 24 | 64.3% | 91.6% | 2.50 ms |
| | 9 | 511 bytes | 3 | 27 | 57.2% | 90.7% | 2.22 ms |
| | 10 | 469 bytes | 2 | 20 | 77.2% | 89.8% | 2.00 ms |
| | 11 | 433 bytes | 2 | 22 | 70.2% | 88.9% | 1.82 ms |
| | 12 | 404 bytes | 2 | 24 | 64.3% | 88.0% | 1.67 ms |
| | 13 | 379 bytes | 2 | 26 | 59.4% | 87.1% | 1.54 ms |
| | 14 | 358 bytes | 2 | 28 | 55.1% | 86.2% | 1.43 ms |
| | 15 | 340 bytes | 2 | 30 | 51.5% | 85.4% | 1.33 ms |
| | 16 | 324 bytes | 2 | 32 | 48.3% | 84.6% | 1.25 ms |
| | 17 | 310 bytes | 2 | 34 | 45.4% | 83.8% | 1.18 ms |
| | 18 | 297 bytes | 2 | 36 | 42.9% | 83.0% | 1.11 ms |
| | 19 | 286 bytes | 2 | 38 | 40.6% | 82.2% | 1.05 ms |
| | 20 | 276 bytes | 2 | 40 | 38.6% | 81.4% | 1.00 ms |

TABLE 11-continued

Examples of TDM Circuit Mappings - Asynchronous Method

| TDM Circuit Bit Rate to be Scheduled | Packets per Schedule Interval | Maximum Expected Packet Size | Appts. per Packet | Total Appts. | Schedule Efficiency | Bandwidth Efficiency | Packetization Delay |
|---|---|---|---|---|---|---|---|
| | 21 | 266 bytes | 2 | 42 | 36.8% | 80.7% | 0.95 ms |
| | 22 | 258 bytes | 2 | 44 | 35.1% | 80.0% | 0.91 ms |
| | 23 | 250 bytes | 1 | 23 | 67.1% | 79.2% | 0.87 ms |
| | 24 | 243 bytes | 1 | 24 | 64.3% | 78.5% | 0.83 ms |
| | 25 | 237 bytes | 1 | 25 | 61.8% | 77.8% | 0.80 ms |
| E3 34.368 Mbps | 61 | 1491 bytes | 6 | 366 | 93.9% | 97.0% | 0.33 ms |
| | 62 | 1469 bytes | 6 | 372 | 92.4% | 96.9% | 0.32 ms |
| | 63 | 1447 bytes | 6 | 378 | 90.9% | 96.9% | 0.32 ms |
| | 64 | 1425 bytes | 6 | 384 | 89.5% | 96.8% | 0.31 ms |
| | 65 | 1405 bytes | 6 | 390 | 88.1% | 96.8% | 0.31 ms |
| | 66 | 1385 bytes | 6 | 396 | 86.8% | 96.7% | 0.30 ms |
| | 67 | 1365 bytes | 6 | 402 | 85.5% | 96.7% | 0.30 ms |
| | 68 | 1346 bytes | 6 | 408 | 84.2% | 96.6% | 0.29 ms |
| | 69 | 1328 bytes | 6 | 414 | 83.0% | 96.6% | 0.29 ms |
| | 70 | 1310 bytes | 6 | 420 | 81.8% | 96.5% | 0.29 ms |
| | 71 | 1293 bytes | 6 | 426 | 80.7% | 96.5% | 0.28 ms |
| | 72 | 1276 bytes | 6 | 432 | 79.6% | 96.4% | 0.28 ms |
| | 73 | 1260 bytes | 6 | 438 | 78.5% | 96.4% | 0.27 ms |
| | 74 | 1244 bytes | 5 | 370 | 92.9% | 96.3% | 0.27 ms |
| | 75 | 1228 bytes | 5 | 375 | 91.6% | 96.3% | 0.27 ms |
| DS-3 44.736 Mbps | 79 | 1498 bytes | 6 | 474 | 94.4% | 97.0% | 0.25 ms |
| | 80 | 1481 bytes | 6 | 480 | 93.2% | 96.9% | 0.25 ms |
| | 81 | 1463 bytes | 6 | 486 | 92.0% | 96.9% | 0.25 ms |
| | 82 | 1447 bytes | 6 | 492 | 90.9% | 96.9% | 0.24 ms |
| | 83 | 1430 bytes | 6 | 498 | 89.8% | 96.8% | 0.24 ms |
| | 84 | 1414 bytes | 6 | 504 | 88.8% | 96.8% | 0.24 ms |
| | 85 | 1398 bytes | 6 | 510 | 87.7% | 96.8% | 0.24 ms |
| | 86 | 1383 bytes | 6 | 516 | 86.7% | 96.7% | 0.23 ms |
| | 87 | 1368 bytes | 6 | 522 | 85.7% | 96.7% | 0.23 ms |
| | 88 | 1354 bytes | 6 | 528 | 84.7% | 96.7% | 0.23 ms |
| | 89 | 1339 bytes | 6 | 534 | 83.8% | 96.6% | 0.22 ms |
| | 90 | 1325 bytes | 6 | 540 | 82.8% | 96.6% | 0.22 ms |
| | 91 | 1312 bytes | 6 | 546 | 81.9% | 96.5% | 0.22 ms |
| | 92 | 1298 bytes | 6 | 552 | 81.0% | 96.5% | 0.22 ms |
| | 93 | 1285 bytes | 6 | 558 | 80.2% | 96.5% | 0.22 ms |
| | 94 | 1272 bytes | 6 | 564 | 79.3% | 96.4% | 0.21 ms |
| | 95 | 1260 bytes | 6 | 570 | 78.5% | 96.4% | 0.21 ms |
| | 96 | 1248 bytes | 5 | 480 | 93.2% | 96.4% | 0.21 ms |
| | 97 | 1236 bytes | 5 | 485 | 92.2% | 96.3% | 0.21 ms |
| | 98 | 1224 bytes | 5 | 490 | 91.3% | 96.3% | 0.20 ms |
| | 99 | 1212 bytes | 5 | 495 | 90.4% | 96.3% | 0.20 ms |
| | 100 | 1201 bytes | 5 | 500 | 89.5% | 96.2% | 0.20 ms |
| EC-1 (STS-1) 51.840 Mbps | 92 | 1491 bytes | 6 | 552 | 93.9% | 97.0% | 0.22 ms |
| | 93 | 1476 bytes | 6 | 558 | 92.9% | 96.9% | 0.22 ms |
| | 94 | 1461 bytes | 6 | 564 | 91.9% | 96.9% | 0.21 ms |
| | 95 | 1447 bytes | 6 | 570 | 90.9% | 96.9% | 0.21 ms |
| | 96 | 1433 bytes | 6 | 576 | 90.0% | 96.8% | 0.21 ms |
| | 97 | 1419 bytes | 6 | 582 | 89.1% | 96.8% | 0.21 ms |
| | 98 | 1405 bytes | 6 | 588 | 88.2% | 96.8% | 0.20 ms |
| | 99 | 1392 bytes | 6 | 594 | 87.3% | 96.7% | 0.20 ms |
| | 100 | 1379 bytes | 6 | 600 | 86.4% | 96.7% | 0.20 ms |
| | 101 | 1366 bytes | 6 | 606 | 85.5% | 96.7% | 0.20 ms |
| | 102 | 1353 bytes | 6 | 612 | 84.7% | 96.7% | 0.20 ms |
| | 103 | 1341 bytes | 6 | 618 | 83.9% | 96.6% | 0.19 ms |
| | 104 | 1329 bytes | 6 | 624 | 83.1% | 96.6% | 0.19 ms |
| | 105 | 1317 bytes | 6 | 630 | 82.3% | 96.6% | 0.19 ms |
| | 106 | 1305 bytes | 6 | 636 | 81.5% | 96.5% | 0.19 ms |
| | 107 | 1294 bytes | 6 | 642 | 80.7% | 96.5% | 0.19 ms |
| | 108 | 1283 bytes | 6 | 648 | 80.0% | 96.5% | 0.19 ms |
| | 109 | 1272 bytes | 6 | 654 | 79.3% | 96.4% | 0.18 ms |
| | 110 | 1261 bytes | 6 | 660 | 78.5% | 96.4% | 0.18 ms |
| | 111 | 1250 bytes | 5 | 555 | 93.4% | 96.4% | 0.18 ms |
| | 112 | 1240 bytes | 5 | 560 | 92.6% | 96.3% | 0.18 ms |
| OC-3/STM-1 155.520 Mbps | 275 | 1497 bytes | 6 | 1650 | 94.3% | 97.0% | 0.07 ms |
| | 276 | 1491 bytes | 6 | 1656 | 93.9% | 97.0% | 0.07 ms |
| | 277 | 1486 bytes | 6 | 1662 | 93.6% | 97.0% | 0.07 ms |
| | 278 | 1481 bytes | 6 | 1668 | 93.2% | 96.9% | 0.07 ms |
| | 279 | 1476 bytes | 6 | 1674 | 92.9% | 96.9% | 0.07 ms |
| | 280 | 1471 bytes | 6 | 1680 | 92.6% | 96.9% | 0.07 ms |
| | 281 | 1466 bytes | 6 | 1686 | 92.2% | 96.9% | 0.07 ms |
| | 282 | 1461 bytes | 6 | 1692 | 91.9% | 96.9% | 0.07 ms |
| | 283 | 1457 bytes | 6 | 1698 | 91.6% | 96.9% | 0.07 ms |

TABLE 11-continued

Examples of TDM Circuit Mappings - Asynchronous Method

| TDM Circuit Bit Rate to be Scheduled | Packets per Schedule Interval | Maximum Expected Packet Size | Appts. per Packet | Total Appts. | Schedule Efficiency | Bandwidth Efficiency | Packetization Delay |
|---|---|---|---|---|---|---|---|
| | 330 | 1261 bytes | 6 | 1980 | 78.5% | 96.4% | 0.06 ms |
| | 331 | 1257 bytes | 6 | 1986 | 78.3% | 96.4% | 0.06 ms |
| | 332 | 1254 bytes | 6 | 1992 | 78.1% | 96.4% | 0.06 ms |
| | 333 | 1250 bytes | 5 | 1665 | 93.4% | 96.4% | 0.06 ms |
| | 334 | 1247 bytes | 5 | 1670 | 93.1% | 96.4% | 0.06 ms |
| | 335 | 1243 bytes | 5 | 1675 | 92.8% | 96.3% | 0.06 ms |

Figure 2:
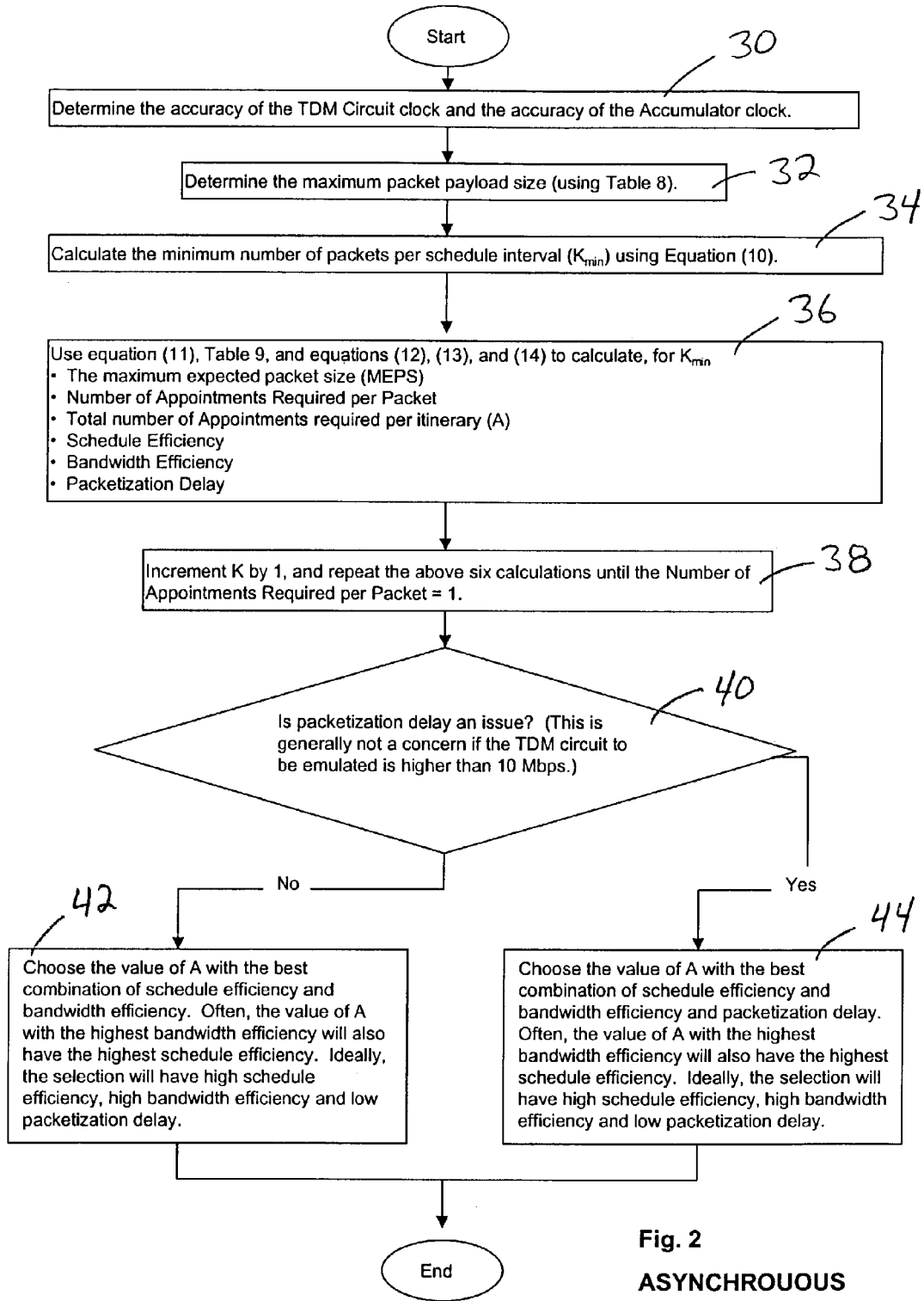
FIG. 2 is a process flow diagram for determining the minimum required number of appointments for any TDM circuit according to a specific asynchronous method of at least one embodiment of the present invention.

Those skilled in the art now have enough information to determine the minimum required number of appointments for a TDM circuit. The steps of a general process are shown in FIG. 2 for the asynchronous method.

First, the accuracy of the TDM circuit and accuracy of the Accumulator clock is determined 30. Next, the maximum packet payload size is determined 32. The minimum number of packets per schedule interval (Kmin) is then calculated 34 using equation (10). The following parameters are then calculated 36 for Kmin: maximum expected packet size, number of appointments required per packet, total number of appointments required per itinerary, schedule efficiency, bandwidth efficiency and packetization delay. The value of K is then incremented and these six parameters are recalculated 38 until the number of appointments per packet equals 1.

Packetization delay is then considered 40. If packetization delay is an issue at this bit rate, then a value for the number of appointments required (A) is chosen 42 with the best combination of schedule efficiency, bandwidth efficiency and packetization delay.

If packetization delay is not an issue at this bit rate, then a value for the number of appointments required (A) is chosen 44 with the best combination of schedule efficiency and bandwidth efficiency.

II. General Illustrative Embodiments of the Invention

While the previous section described specific illustrative embodiments of synchronous and asynchronous methods according to the invention, the following generally describes the method according to the invention to calculate the requisite descriptors of a scheduled IP itinerary for an emulated TDM circuit, given any TDM bit rate. After the following description of the general case for both synchronous and asynchronous systems and methodology, illustrative embodiments are derived (all subject to the assumptions hereinafter). The first derived embodiment for each of synchronous and asynchronous systems and methodology described hereinafter relates to a 20 ms schedule interval and 250 byte appointment size (which is the same as presented in Sections IA and IB hereinbefore). The second derived embodiment for each of synchronous and asynchronous systems and methodology described hereinafter relates to a 120 ms schedule interval and 50 byte appointment size. While there is some redundancy, the illustrative embodiments described hereinafter are demonstrative of the general and specific applicability of the systems and methods according to the invention.

Again, TDM circuits can be generally mapped across scheduled networks using one of the following methods:
1. Synchronous Method.
   In the Synchronous Method, all TDM circuits are synchronized to the scheduled network. For each TDM circuit, a specified number of TDM circuit bytes that occur in an integer number of periods, such as 125 microsecond (μs), are mapped into each scheduled packet.
2. Asynchronous Method.
   In the Asynchronous Method, each TDM circuit is allowed to be asynchronous relative to the scheduled network. Each TDM circuit is accumulated into a buffer for a provisionable amount of time (the Accumulation Interval), and the number of accumulated bits (truncated to an integer number of bytes) are placed into each scheduled packet. The time of the Accumulation Interval is referenced to the scheduled network clock. Since the TDM circuits are not synchronized to the scheduled network, the number of bytes per scheduled packet is expected to vary by a small amount.

TDM circuits can be categorized into five categories:
1. The 24-channel Plesiochronous Digital Hierarchy, named because the primary interface, DS1, includes 24 individual 64 kbit/s payload channels.
2. The 30-channel Plesiochronous Digital Hierarchy, named because the primary interface, E1, usually includes 30 individual 64 kbit/s payload channels.
3. Synchronous Optical Network (SONET).
4. Synchronous Digital Hierarchy (SDH).
5. All other serial or parallel bit streams.

Table 12 and Table 13 list examples of these PDH, SONET, and SDH circuits, their interface rates, and examples of some payloads that each can transport. Many of these interfaces can have several different payload options, and all are candidates for the present invention.

TABLE 12

PDH Circuit Interfaces

| PDH Interface | TDM Interface Rate | Channelized Payload |
|---|---|---|
| DS1 | 1.544 Mbps | 24 channels @ 64 kbps |
| DS1c | 3.152 Mbps | 2 DS1s |
| DS2 | 6.312 Mbps | 4 DS1s |
| DS3 | 44.736 Mbps | 7 DS2s |
| DS4NA | 139.264 Mbps | 3 DS3s |
| DS4 | 274.176 Mbps | 6 DS3s |
| E1 | 2.048 Mbps | 30 channels @ 64 kpbs |
| E2 | 8.448 Mbps | 4 E1s |
| E3 | 34.368 Mbps | 4 E2s |
| E4 | 139.264 Mbps | 4 E3s |
| E5 | 565.148 Mbps | 4 E4s |

TABLE 13

SONET and SDH Circuit Interfaces

| SONET Interface | Full TDM Interface Rate | Synchronous Payload Envelope | Payload Capacity |
|---|---|---|---|
| OC-1 | 51.840 Mpbs | 50.112 Mpbs | 49.536 Mpbs |
| OC-3 | 155.520 Mpbs | 150.336 Mpbs | 149.760 Mpbs |
| OC-12 | 622.080 Mpbs | 601.344 Mpbs | 599.040 Mpbs |
| OC-48 | 2488.320 Mpbs | 2405.376 Mpbs | 2396.160 Mpbs |
| OC-192 | 9953.280 Mpbs | 9621.504 Mpbs | 9584.640 Mpbs |
| OC-768 | 39813.120 Mpbs | 38486.016 Mpbs | 38338.560 Mpbs |

| SDH Interface | Full TDM Interface Rate | Synchronous Payload Envelope | Payload Capacity |
|---|---|---|---|
| STM-1 | 155.520 Mpbs | 150.336 Mpbs | 149.760 Mpbs |
| STM-4 | 622.080 Mpbs | 601.344 Mpbs | 599.040 Mpbs |
| STM-16 | 2488.320 Mpbs | 2405.376 Mpbs | 2396.160 Mpbs |
| STM-64 | 9953.280 Mpbs | 9621.504 Mpbs | 9584.640 Mpbs |
| STM-256 | 39813.120 Mpbs | 38486.016 Mpbs | 38338.560 Mpbs |

The descriptors for a TDM circuit schedule itinerary include the following:

Total number of appointments required for the TDM circuit.

Number of appointments for each scheduled IP packet.

Synchronous Method only—The number of 125 microsecond (µs) TDM frames per scheduled IP packet (or the number of TDM payload bytes per scheduled IP packet).

Asynchronous Method only—The Accumulation Interval, which is the time to accumulate an integer number of TDM circuit bytes into each scheduled packet.

Schedule efficiency across the scheduled IP network, which is the ratio of the original TDM circuit bit rate to the amount of bandwidth reserved by the total number of appointments in its itinerary over a scheduled packet network.

Bandwidth efficiency across the scheduled IP network, which is the ratio of the original TDM circuit bit rate to the bit rate of the scheduled packet, including IP and higher layer (e.g., UDP) overhead.

Packetization delay. This is the time required to accumulate TDM circuit bits into a packet.

It will be shown that for any TDM circuit, the formulas in the present invention offer several choices of scheduled packet sizes. If the formulas produce more than one choice, a choice is made by balancing schedule efficiency, bandwidth efficiency and packetization delay.

The distribution of the scheduled IP packets onto itineraries also affects the delay of the converted TDM signal; this phenomenon is examined in the final section. The two boundary cases—an even distribution for minimum delay, and a buffered block with maximum delay—are described. The large number of possibilities in between, and their effect on the network, is beyond the scope of this document.

Assumptions

There are several variables to be considered for mapping TDM circuits into scheduled IP packets, including the packet protocols, the size of the packet, and the boundaries between packets. The assumptions for the formulas for the second illustrative embodiment described herein are as follows:

1. It is assumed that TDM circuits are converted to scheduled IP packets. The packets can then be transported over Ethernet, SONET, or any other type of network media formats. Since Ethernet has more frame overhead than Packet-over-SONET and other Optical mappings, it represents the worst case. The calculations shown in accordance with the present invention assume that Ethernet transport is an illustrative media for the scheduled packets, and the maximum payload is adjusted accordingly for this worst case. It is straightforward to adjust this maximum payload by using media other than Ethernet.

2. Correlation between TDM frames and packet payloads.
   a. For the synchronous method, each scheduled IP packet should contain an integer number of 125 µs TDM frames for TDM circuits less than about 91 Mbps. DS3 TDM frames are unique in that they do not repeat every 125 µs, but a DS3 does represent an integer number of bytes every 125 µs. Individual DS0s do not have a frame; they represent a single byte every 125 µs. DS1s have a 193-bit frame every 125 µs, which is not an integer number of bytes; therefore, an optimal DS1 solution should convert every N×8 frames into a scheduled IP packet. As later assumptions will show, a 1500-byte Ethernet packet will contain 1418 bytes of payload, with the rest of the packet being overhead. The 1418 byte payload data representing a single 125 µs TDM frame, translates to a TDM circuit rate of 1418*8/125 µs=90.8 Megabits per second (Mbps). For TDM circuit speeds higher than about 91 Mbps, each scheduled IP packet should contain a fraction of a 125 µs TDM frame. This is intended to simplify the packetization design and timing recovery; other TDM sample times can also be used.
   b. For the asynchronous method, each scheduled IP packet can contain any number of bytes, subject to the maximum packet size in Assumption 5, below.

3. The formulas for both the synchronous and asynchronous methods depend on two scheduling parameters: the schedule interval (cycle time of appointments) and the appointment size. Both methods will be described in detail with the following sets of schedule parameters:
   a. First, the schedule interval (SI) is assumed to be 20 milliseconds (ms), and the appointment size (Appt_Size) is assumed to be 2000 bits (250 bytes).
   b. Next, the schedule interval (SI) is assumed to be 120 milliseconds (ms), and the appointment size (Appt_Size) is assumed to be 400 bits (50 bytes).

4. The maximum IP packet size is assumed to be constrained such that this packet on standard Ethernet can be fully contained in an integer number of appointments. This constraint helps to keep schedule efficiency high for TDM circuits over IP. Note that the largest standard IP/Ethernet packet is 1538 bytes, including 1500 bytes for the IP packet, 24 bytes for Ethernet overhead, and 12 bytes for the minimum interframe gap. (Although, Ethernet VLAN packets have a maximum size of 1542 bytes, which include a 4-byte VLAN tag, the illustrative examples assume that the VLAN tag is not present, although the present method also applies to Ethernet VLANs.) The maximum number of appointments per scheduled packet is therefore:

$$G_{max} = \text{Integer}\left(\frac{\text{Maximum\_Packet\_Size}}{\text{Appt\_Size}}\right) = \text{Integer}\left(\frac{1538}{\text{Appt\_Size}}\right)$$

where $G_{max}$ is the maximum contiguous group of appointments per scheduled packet.

Consider the following illustrative examples:
  a. An appointment size of 250 bytes. A maximum sized IP/Ethernet frame would span 1538/250=6.152 appointments. Therefore, a maximum sized emulated TDM/Scheduled_IP/Ethernet packet is constrained to span exactly 6 appointments, or 1500 bytes. The emulated TDM/Scheduled_IP packet (without Ethernet overhead) should be no larger than 1500−38=1462 bytes.
  b. An appointment size of 50 bytes. A maximum sized IP/Ethernet frame would span 1538/50=30.76 appointments. Therefore, a maximum sized TDM/Scheduled_IP/Ethernet packet is constrained to span exactly 30 appointments, or 1500 bytes. The emulated TDM/Scheduled_IP packet (without Ethernet overhead) should be no larger than 1500−38=1462 bytes.
  c. In general, other appointment sizes will lead to different maximum packet sizes.
5. High-layer packet overhead (overhead for layers above the IP layer) is assumed to include UDP, RTP, and a 4-byte TDM-specific control header, for a total of 24 bytes:
  a. [LDP$_8$] represents the 8 bytes of User Datagram Protocol (UDP) overhead. UDP is assumed to be used instead of Transmission Control Protocol (TCP) because of its better efficiency and lack of packet retransmissions.
  b. [RTP$_{12}$] represents the 12 bytes of Real Time Protocol (RTP) overhead. RTP provides time stamping and sequencing. RTP might benefit the performance through a Scheduled IP network, or it could be chosen for compatibility with mappings over non-scheduled packet networks.
  c. [TDMC$_4$] represents the 4 bytes of TDM Control overhead. This field can indicate conventional circuit conditions such as Loss of Signal, Remote Defect, or Alarm Indication Signal (AIS), but the details of this field are outside the scope of the present invention. Other values can be chosen for TDM Control, including the absence altogether of this overhead.
  d. The above packet overhead is in addition to the 20-byte IP overhead, and the 38-byte Ethernet overhead (including 12 bytes for the minimum Ethernet gap). Therefore, each packet is assumed to have as much as 82 bytes of overhead.
  e. The 4-byte Ethernet VLAN header is assumed NOT to be present. Those skilled in the art can adjust the packet overhead by 4 bytes to include VLAN overhead [VLAN$_4$] on Ethernet interfaces, or choose other packet overhead combinations.

It should be appreciated by those skilled in the art that other assumptions may be made in using the formulas as a function of the application. More specifically, other assumptions may be made based on different network configurations (i.e. other than Ethernet), and timing considerations. For example, the appointment size could be other than 50 or 250 bytes; that affects the method by changing the values for the maximum payload in a scheduled packet.

IIA. Synchronous Method—General Case

The key starting formula for the Synchronous Method is found by matching the number of TDM circuit bytes in a schedule interval with the number of payload bytes in a scheduled itinerary in the same schedule interval.

$$\frac{F_T \times SI}{T} = \frac{A \times P}{G} \quad (15)$$

$$\frac{F \times SI}{0.125} = \frac{A \times P}{G}$$

$F_T$ is the number of TDM bytes per time interval T.
F is the number of TDM bytes in a 125 microsecond (0.125 millisecond) frame. For other TDM frame intervals, substitute the length of the TDM frame interval, in milliseconds, for 0.125. F should then represent the number of bytes in this TDM frame interval.
SI is the schedule interval in milliseconds (ms).
A is the total number of appointments per schedule interval for the emulated TDM circuit.
P is the size of each scheduled IP packet payload, in bytes. The IP packet payload does not include any overhead bytes for RTP, UDP, IP, or Ethernet.
G is the group of appointments that each packet requires.

Solving for A, we get:

$$A = \frac{F \times G \times SI}{P \times 0.125} \quad (16)$$

It is known from Assumption 2a that the size of each scheduled IP packet payload (P) is a multiple (N) of the bytes in a 125 μs TDM frame (F).

$$P = N \times F \quad (17)$$

N is the number of 125 μs TDM frames in each scheduled IP packet.

Substituting Equation (17) into Equation (16) results in:

$$A = \frac{G \times SI}{N_T \times T} = \frac{G \times SI}{N \times 0.125} \quad (18)$$

wherein $N_T$ is the number of TDM frames in time interval T.

There are three additional constraints that can be placed on Equation (18) to converge on a solution:

1. A must be an integer.
2. It is desired that N also be an integer for most TDM circuits (N can be an integer fraction for TDM circuits above about 91 Mbps). Integer factors and a lookup function can be used to determine the number of appointments (A) per Schedule Interval, and a corresponding number of TDM frames per packet (N), for each value of G.
3. There is a minimum number of appointments per schedule interval (A') required, based on the number of TDM frames to be mapped and packet size. A' must be at least the number of appointments for a single packet (G), and it must also satisfy Equation (16) for the largest packet size. This can be expressed as the following, for each value of G:

$$A' = \max\left(G, \frac{F \times G \times SI}{P_{\max} \times 0.125}\right) \qquad (19)$$

A' is one constraint that sets the minimum number of appointments required per Schedule Interval, for each possible value of G.

The maximum packet payload size ($P_{max}$) depends on the appointment size and number group of appointments per packet:

$$P_{\max} = (\text{Appt\_Size} \times G) - \text{Max\_Overhead} = (\text{Appt\_Size} \times G) - 82 \qquad (20)$$

Max_Overhead is the maximum number of overhead bytes per packet, which is 82 bytes (see Assumption 5d).

The possible Appointments per Schedule Interval are now determined by choosing the lowest integer that satisfies both equations (18) and (19) for each value of G.

For most TDM circuits, this will still leave several choices for possible mappings; up to one minimum value of A for each value of G. The final selection is made by choosing a balance between Packetization Delay, Schedule Efficiency, and Bandwidth Efficiency. Each of these three parameters is described below.

Packetization Delay

Packetization delay is proportional to the number of 125 μs TDM frames in each scheduled IP packet:

$$\text{Packetization\_Delay} = N_T \times T = N \times 125 \text{ μs} \qquad (21)$$

wherein $N_T$ is the number of TDM frames in time interval T.

Schedule Efficiency

The schedule efficiency (Sched_Eff) of an emulated TDM circuit refers to the ratio of the original TDM circuit bit rate to the amount of bandwidth reserved by the total number of appointments in its itinerary over a scheduled packet network. This also equates to the number of TDM circuit bytes in a schedule interval divided by the number of reserved appointment bytes in that schedule interval. The TDM circuit bit rate is represented by the number of bytes per 125 μs TDM frame (F).

$$\text{Sched\_Eff} = \frac{\frac{F_T}{T}}{\frac{A \times \text{Appt\_Size}}{SI}} = \frac{F \times SI}{A \times \text{Appt\_Size} \times 0.125} \qquad (22)$$

wherein $F_T$ is the number of TDM bytes per time interval T.

Bandwidth Efficiency

The Bandwidth Efficiency across the scheduled IP network is the ratio of the original TDM circuit bit rate to the bit rate of the scheduled packet flow, including IP and higher layer (e.g., UDP) overhead. Alternatively, the Bandwidth Efficiency is the ratio of packet payload to overall packet size (including IP and higher overhead). The Bandwidth Efficiency (BW_Eff) can be calculated by the following equation:

$$\text{BW\_Eff} = \frac{N_T \times F_T}{N_T \times F_T + \text{Max\_IP\_Overhead}} = \frac{N \times F}{N \times F + 44} \qquad (23)$$

Max_IP_Overhead represents the maximum total number of packet overhead bytes at or above the IP layer. According to Assumption 5, this includes IP overhead (20 bytes), UDP (8 bytes), RTP (12 bytes), and TDM Control (4 bytes) which equals 44 in the present illustrative embodiment. This does not include overhead specific to a physical interface layer, such as Ethernet.

The Synchronous Method is described in detail in the following sections for two different sets of scheduling parameters. As mentioned previously, those skilled in the art can readily determine the formulas for other values of scheduling parameters in view hereof.

IIB. The Synchronous Method with 20 ms Schedule Intervals and 250-byte Appointments as Derived From the General Methodology.

Substituting a Schedule Interval (SI) of 20 ms into Equation 18 results in:

$$A = \frac{160 \times G}{N} \qquad (24)$$

As noted in Assumption 4a, the maximum sized TDM/Scheduled_IP packet is constrained to occupy a maximum of six (6) 250-byte appointments. Therefore, the group of appointments per packet (G) is in the range [1:6]. Equation (24) can now be specified for the six possible instances of G, which is summarized by Equation (25):

$$\begin{aligned} G = 1 &: A_1 = \frac{160}{N_1} \\ G = 2 &: A_2 = \frac{320}{N_2} \\ G = 3 &: A_3 = \frac{480}{N_3} \\ G = 4 &: A_4 = \frac{640}{N_4} \\ G = 5 &: A_5 = \frac{800}{N_5} \\ G = 6 &: A_6 = \frac{960}{N_6} \end{aligned} \qquad (25)$$

Since A and N are generally both integers, the possible number of appointments become an integer factor of the values 160, 320, 480, 640, 800, and 960. There are only a finite number of integers that can satisfy the set of equations in (25) above. Table 14 shows the possible values for $\{A_1:A_6\}$.

TABLE 14

Possible Integer Values of A and N

| G = 1 | | G = 2 | | G = 3 | | G = 4 | | G = 5 | | G = 6 | |
|---|---|---|---|---|---|---|---|---|---|---|---|
| $A_1$ | $N_1$ | $A_2$ | $N_2$ | $A_3$ | $N_3$ | $A_4$ | $N_4$ | $A_5$ | $N_5$ | $A_6$ | $N_6$ |
| 1 | 160 | 1 | 320 | 1 | 480 | 1 | 640 | 1 | 800 | 1 | 960 |
| 2 | 80 | 2 | 160 | 2 | 240 | 2 | 320 | 2 | 400 | 2 | 480 |
| 4 | 40 | 4 | 80 | 3 | 160 | 4 | 160 | 4 | 200 | 3 | 320 |
| 5 | 32 | 5 | 64 | 4 | 120 | 5 | 128 | 5 | 160 | 4 | 240 |
| 8 | 20 | 8 | 40 | 5 | 96 | 8 | 80 | 8 | 100 | 5 | 192 |
| 10 | 16 | 10 | 32 | 6 | 80 | 10 | 64 | 10 | 80 | 6 | 160 |
| 16 | 10 | 16 | 20 | 8 | 60 | 16 | 40 | 16 | 50 | 8 | 120 |
| 20 | 8 | 20 | 16 | 10 | 48 | 20 | 32 | 20 | 40 | 10 | 96 |
| 32 | 5 | 32 | 10 | 12 | 40 | 32 | 20 | 25 | 32 | 12 | 80 |
| 40 | 4 | 40 | 8 | 15 | 32 | 40 | 16 | 32 | 25 | 15 | 64 |
| 80 | 2 | 64 | 5 | 16 | 30 | 64 | 10 | 40 | 20 | 16 | 60 |
| 160 | 1 | 80 | 4 | 20 | 24 | 80 | 8 | 50 | 16 | 20 | 48 |
| | | 160 | 2 | 24 | 20 | 128 | 5 | 80 | 10 | 24 | 40 |
| | | 320 | 1 | 30 | 16 | 160 | 4 | 100 | 8 | 30 | 32 |
| | | | | 32 | 15 | 320 | 2 | 160 | 5 | 32 | 30 |
| | | | | 40 | 12 | 640 | 1 | 200 | 4 | 40 | 24 |
| | | | | 48 | 10 | | | 400 | 2 | 48 | 20 |
| | | | | 60 | 8 | | | 800 | 1 | 60 | 16 |
| | | | | 80 | 6 | | | | | 64 | 15 |
| | | | | 96 | 5 | | | | | 80 | 12 |
| | | | | 120 | 4 | | | | | 96 | 10 |
| | | | | 160 | 3 | | | | | 120 | 8 |
| | | | | 240 | 2 | | | | | 160 | 6 |
| | | | | 480 | 1 | | | | | 192 | 5 |
| | | | | | | | | | | 240 | 4 |
| | | | | | | | | | | 320 | 3 |
| | | | | | | | | | | 480 | 2 |
| | | | | | | | | | | 960 | 1 |

However, two conditions set the minimum number of appointments required:

1. There must be at least the number of appointments taken up by a packet (group size, G). In other words, the total number of appointments must be at least the number of appointments required for a single packet.
2. For each group size (G) there is a maximum packet payload size ($P_{max}$) that also sets a minimum number of appointments, $A'$.

For $i = \{1:6\}$, $A'_i = \max\left(G_i, \frac{F \times G_i \times 160}{P_{max\ i}}\right)$ or specifically, (28)

$$A'_1 = \max\left(1, \frac{F \times 160}{P_{max\ i}}\right)$$

$$A'_2 = \max\left(2, \frac{F \times 320}{P_{max\ i}}\right)$$

$$A'_3 = \max\left(3, \frac{F \times 480}{P_{max\ i}}\right)$$

$$A'_4 = \max\left(4, \frac{F \times 640}{P_{max\ i}}\right)$$

$$A'_5 = \max\left(5, \frac{F \times 800}{P_{max\ i}}\right)$$

$$A'_6 = \max\left(6, \frac{F \times 960}{P_{max\ i}}\right)$$

The maximum packet payload size ($P_{max}$) for each of the 6 group sizes of appointments is limited by the number of payload bytes that the packet can support. Table 15 shows the maximum capacity of TDM payload per scheduled packet ($P_{max}$) for each of the appointment group sizes. The number 82 represents the maximum number of overhead bytes per packet.

TABLE 15

Maximum Packet Payloads ($P_{max}$) vs. Appointment Groups per Packet (G)

| G | $P_{max}$ (in Bytes) |
|---|---|
| 1 | $P_{max1} = (250 - 82) = 168$ |
| 2 | $P_{max2} = P_{max1} + 250 = 418$ |
| 3 | $P_{max3} = P_{max2} + 250 = 668$ |
| 4 | $P_{max4} = P_{max3} + 250 = 918$ |
| 5 | $P_{max5} = P_{max4} + 250 = 1168$ |
| 6 | $P_{max6} = P_{max5} + 250 = 1418$ |

Delay and Efficiency Considerations

Equations (24) through (26) in the previous section may result in up to 6 possible values of the total minimum number of appointments per schedule interval (A), the number of TDM frames per IP packet (F), and Appointments per packet (G). The final selection is made by choosing a balance between Packetization Delay, Schedule Efficiency, and Bandwidth Efficiency.

Equations (19) and (21) can be used to determine the Packetization Delay and Bandwidth Efficiency. Equation (20) can be simplified by substituting the schedule parameters assumed in this section, namely a Schedule Interval (SI) of 20 ms, and an Appointment Size (Appt_Size) of 250 bytes. The schedule efficiency (Sched_Eff) can then be calculated by substituting Appointment Size and Schedule Interval values into equation (22), which results in:

$$\text{Sched\_Eff} = \frac{F \times SI}{A \times \text{Appt\_Size} \times 0.125} = \frac{F \times 20}{A \times 250 \times 0.125} = \frac{0.64 \times F}{A} \quad (27)$$

TDM Circuit Example

Consider the E1 circuit, which is used extensively outside of the U.S. The E1 bit rate, including overhead, is 2.048 Mbps. Therefore F=32 bytes every 125 µs. Equations (21), (23), (24), (26), and (27) and Table 15 are then used to calculate the values shown in Table 16 below.

TABLE 16

Example: E1 Circuit - Synchronous Method with Schedule Interval = 20 ms and Appointment Size = 250 bytes

| G | A' | A × N | A | N | Schedule Efficiency | Bandwidth Efficiency | Packetization Delay |
|---|-------|-------|----|----|-------|-------|--------|
| 1 | 30.48 | 160 | 32 | 5 | 64.0% | 78.4% | 0.6 ms |
| 2 | 24.50 | 320 | 32 | 10 | 64.0% | 87.9% | 1.3 ms |
| 3 | 22.99 | 480 | 24 | 20 | 85.3% | 93.6% | 2.5 ms |
| 4 | 22.31 | 640 | 32 | 20 | 64.0% | 93.6% | 2.5 ms |
| 5 | 21.92 | 800 | 25 | 32 | 81.9% | 95.9% | 4.0 ms |
| 6 | 21.66 | 960 | 24 | 40 | 85.3% | 96.7% | 5.0 ms |

TABLE 17

Examples of TDM Circuit Mappings - Synchronous Method with 20 ms Schedule Interval, 50-byte Appointments

| Circuit | TDM Bit Rate | F | G | A' | A × N | A | N | Schedule Efficiency | Bandwidth Efficiency | Packetization Delay |
|---------|--------------|---|---|------|-------|-----|-----|-------|-------|--------|
| DS1 | 1.544 Mbps | 24.125 Bytes | 1 | 22.44 | 160 | 32 | 5 | 48.3% | 73.3% | 0.6 ms |
| | | | 2 | 18.29 | 320 | 20 | 16 | 77.2% | 89.8% | 2.0 ms |
| | | | 3 | 17.23 | 480 | 20 | 24 | 77.2% | 92.9% | 3.0 ms |
| | | | 4 | 16.75 | 640 | 20 | 32 | 77.2% | 94.6% | 4.0 ms |
| | | | 5 | 16.47 | 800 | 20 | 40 | 77.2% | 95.6% | 5.0 ms |
| | | | 6 | 16.29 | 960 | 20 | 48 | 77.2% | 96.3% | 6.0 ms |
| E1 | 2.048 Mbps | 32 Bytes | 1 | 29.77 | 160 | 32 | 5 | 64.0% | 78.4% | 0.6 ms |
| | | | 2 | 24.27 | 320 | 32 | 10 | 64.0% | 87.9% | 1.3 ms |
| | | | 3 | 22.86 | 480 | 24 | 20 | 85.3% | 93.6% | 2.5 ms |
| | | | 4 | 22.21 | 640 | 32 | 20 | 64.0% | 93.6% | 2.5 ms |
| | | | 5 | 21.84 | 800 | 25 | 32 | 81.9% | 95.9% | 4.0 ms |
| | | | 6 | 21.60 | 960 | 24 | 40 | 85.3% | 96.7% | 5.0 ms |
| E3 | 34.368 Mbps | 537 Bytes | 1 | 499.53 | 160 | — | — | — | — | — |
| | | | 2 | 407.20 | 320 | — | — | — | — | — |
| | | | 3 | 383.57 | 480 | 480 | 1 | 71.6% | 92.4% | 0.1 ms |
| | | | 4 | 372.75 | 640 | 640 | 1 | 53.7% | 92.4% | 0.1 ms |
| | | | 5 | 366.55 | 800 | 400 | 2 | 85.9% | 96.1% | 0.3 ms |
| | | | 6 | 362.53 | 960 | 480 | 2 | 71.6% | 96.1% | 0.3 ms |
| DS3 | 44.736 Mbps | 699 Bytes | 1 | 650.23 | 160 | — | — | — | — | — |
| | | | 2 | 530.05 | 320 | — | — | — | — | — |
| | | | 3 | 499.29 | 480 | — | — | — | — | — |
| | | | 4 | 485.21 | 640 | 640 | 1 | 69.9% | 94.1% | 0.1 ms |
| | | | 5 | 477.13 | 800 | 800 | 1 | 55.9% | 94.1% | 0.1 ms |
| | | | 6 | 471.90 | 960 | 480 | 2 | 93.2% | 96.9% | 0.3 ms |
| EC-1 (STS-1) | 51.840 Mbps | 810 Bytes | 1 | 753.49 | 160 | — | — | — | — | — |
| | | | 2 | 614.22 | 320 | — | — | — | — | — |
| | | | 3 | 578.57 | 480 | — | — | — | — | — |
| | | | 4 | 562.26 | 640 | 640 | 1 | 81.0% | 94.8% | 0.1 ms |
| | | | 5 | 552.90 | 800 | 800 | 1 | 64.8% | 94.8% | 0.1 ms |
| | | | 6 | 546.84 | 960 | 960 | 1 | 54.0% | 94.8% | 0.1 ms |
| OC-3/ STM-1 | 155.520 Mbps | 2430 Bytes | 1 | 2260.47 | 160 | — | — | — | — | — |
| | | | 2 | 1842.65 | 320 | — | — | — | — | — |
| | | | 3 | 1735.71 | 480 | — | — | — | — | — |
| | | | 4 | 1686.77 | 640 | — | — | — | — | — |
| | | | 5 | 1658.70 | 800 | — | — | — | — | — |
| | | | 6 | 1640.51 | 960 | 1920 | 0.5 | 81.0% | 96.5% | 0.1 ms |

Although there are two resulting configurations in Table 16 that have the highest Schedule Efficiency (G=3 and G=6, each with 24 appointments), the former has a lower bandwidth efficiency but much less packetization delay. The choice can be made depending upon overall efficiency and delay requirements. If packetization delay needs to be even lower, G=1 or G=2 (24 appointments each), may be preferable.

More examples of common TDM circuits are shown in Table 17 below. Note that the high speed of OC-3/STM-1 limits the conversion to ½ of the bytes in each TDM frame. Cells in the table containing "—" indicate no solution for that packet size.

IIC. The Synchronous Method with 120 ms Schedule Intervals and 50-byte Appointments as Derived From the General Methodology Substituting a Schedule Interval (SI) of 120 ms into Equation 18, results in:

$$A = \frac{960 \times G}{N} \quad (28)$$

As noted in Assumption 4b, the maximum sized TDM/Scheduled_IP packet is constrained to occupy thirty (30)

50-byte appointments. Therefore, the group of appointments per packet (G) is in the range [1:30]. Equation (28) can now be specified for the thirty possible instances of G, which is summarized by:

$$G = 1 : A_1 = \frac{960}{N_1}$$

$$G = 2 : A_2 = \frac{1920}{N_2}$$

$$G = 3 : A_3 = \frac{2880}{N_3}$$

...

$$G = 29 : A_5 = \frac{27840}{N_5}$$

$$G = 30 : A_6 = \frac{28800}{N_6}$$

(29)

Since A and N are generally both integers, the possible number of appointments become an integer factor of the values 960, 1920, 2880, . . . , 27840, and 28800 in equation (29). There are only a finite number of integers that can satisfy the set of equations in (29) above. Table 18 (which spans multiple pages) shows the possible values of A and N for $\{G_1:G_{30}\}$.

TABLE 18

Integer Factors for G = {1:30}

| G | A × N | Integer Factors (Possible Values of A and N) |
|---|---|---|
| 1 | 960 | 1, 2, 3, 4, 5, 6, 8, 10, 12, 15, 16, 20, 24, 30, 32, 40, 48, 60, 64, 80, 96, 120, 160, 192, 240, 320, 480, 960 |
| 2 | 1920 | 1, 2, 3, 4, 5, 6, 8, 10, 12, 15, 16, 20, 24, 30, 32, 40, 48, 60, 64, 80, 96, 120, 128, 160, 192, 240, 320, 384, 480, 640, 960, 1920 |
| 3 | 2880 | 1, 2, 3, 4, 5, 6, 8, 9, 10, 12, 15, 16, 18, 20, 24, 30, 32, 36, 40, 45, 48, 60, 64, 72, 80, 90, 96, 120, 144, 160, 180, 192, 240, 288, 320, 360, 480, 576, 720, 960, 1440, 2880 |
| 4 | 3840 | 1, 2, 3, 4, 5, 6, 8, 10, 12, 15, 16, 20, 24, 30, 32, 40, 48, 60, 64, 80, 96, 120, 128, 160, 192, 240, 256, 320, 384, 480, 640, 768, 960, 1280, 1920, 3840 |
| 5 | 4800 | 1, 2, 3, 4, 5, 6, 8, 10, 12, 15, 16, 20, 24, 25, 30, 32, 40, 48, 50, 60, 64, 75, 80, 96, 100, 120, 150, 160, 192, 200, 240, 300, 320, 400, 480, 600, 800, 960, 1200, 1600, 2400, 4800 |
| 6 | 5760 | 1, 2, 3, 4, 5, 6, 8, 9, 10, 12, 15, 16, 18, 20, 24, 30, 32, 36, 40, 45, 48, 60, 64, 72, 80, 90, 96, 120, 128, 144, 160, 180, 192, 240, 288, 320, 360, 384, 480, 576, 640, 720, 960, 1152, 1440, 1920, 2880, 5760 |
| 7 | 6720 | 1, 2, 3, 4, 5, 6, 7, 8, 10, 12, 14, 15, 16, 20, 21, 24, 28, 30, 32, 35, 40, 42, 48, 56, 60, 64, 70, 80, 84, 96, 105, 112, 120, 140, 160, 168, 192, 210, 224, 240, 280, 320, 336, 420, 448, 480, 560, 672, 840, 960, 1120, 1344, 1680, 2240, 3360, 6720 |
| 8 | 7680 | 1, 2, 3, 4, 5, 6, 8, 10, 12, 15, 16, 20, 24, 30, 32, 40, 48, 60, 64, 80, 96, 120, 128, 160, 192, 240, 256, 320, 384, 480, 512, 640, 768, 960, 1280, 1536, 1920, 2560, 3840, 7680 |
| 9 | 8640 | 1, 2, 3, 4, 5, 6, 8, 9, 10, 12, 15, 16, 18, 20, 24, 27, 30, 32, 36, 40, 45, 48, 54, 60, 64, 72, 80, 90, 96, 108, 120, 135, 144, 160, 180, 192, 216, 240, 270, 288, 320, 360, 432, 480, 540, 576, 720, 864, 960, 1080, 1440, 1728, 2160, 2880, 4320, 8640 |
| 10 | 9600 | 1, 2, 3, 4, 5, 6, 8, 10, 12, 15, 16, 20, 24, 25, 30, 32, 40, 48, 50, 60, 64, 75, 80, 96, 100, 120, 128, 150, 160, 192, 200, 240, 300, 320, 384, 400, 480, 600, 640, 800, 960, 1200, 1600, 1920, 2400, 3200, 4800, 9600 |
| 11 | 10560 | 1, 2, 3, 4, 5, 6, 8, 10, 11, 12, 15, 16, 20, 22, 24, 30, 32, 33, 40, 44, 48, 55, 60, 64, 66, 80, 88, 96, 110, 120, 132, 160, 165, 176, 192, 220, 240, 264, 320, 330, 352, 440, 480, 528, 660, 704, 880, 960, 1056, 1320, 1760, 2112, 2640, 3520, 5280, 10560 |
| 12 | 11520 | 1, 2, 3, 4, 5, 6, 8, 9, 10, 12, 15, 16, 18, 20, 24, 30, 32, 36, 40, 45, 48, 60, 64, 72, 80, 90, 96, 120, 128, 144, 160, 180, 192, 240, 256, 288, 320, 360, 384, 480, 576, 640, 720, 768, 960, 1152, 1280, 1440, 1920, 2304, 2880, 3840, 5760, 11520 |
| 13 | 12480 | 1, 2, 3, 4, 5, 6, 8, 10, 12, 13, 15, 16, 20, 24, 26, 30, 32, 39, 40, 48, 52, 60, 64, 65, 78, 80, 96, 104, 120, 130, 156, 160, 192, 195, 208, 240, 260, 312, 320, 390, 416, 480, 520, 624, 780, 832, 960, 1040, 1248, 1560, 2080, 2496, 3120, 4160, 6240, 12480 |
| 14 | 13440 | 1, 2, 3, 4, 5, 6, 7, 8, 10, 12, 14, 15, 16, 20, 21, 24, 28, 30, 32, 35, 40, 42, 48, 56, 60, 64, 70, 80, 84, 96, 105, 112, 120, 128, 140, 160, 168, 192, 210, 224, 240, 280, 320, 336, 384, 420, 448, 480, 560, 640, 672, 840, 896, 960, 1120, 1344, 1680, 1920, 2240, 2688, 3360, 4480, 6720, 13440 |
| 15 | 14400 | 1, 2, 3, 4, 5, 6, 8, 9, 10, 12, 15, 16, 18, 20, 24, 25, 30, 32, 36, 40, 45, 48, 50, 60, 64, 72, 75, 80, 90, 96, 100, 120, 144, 150, 160, 180, 192, 200, 225, 240, 288, 300, 320, 360, 400, 450, 480, 576, 600, 720, 800, 900, 960, 1200, 1440, 1600, 1800, 2400, 2880, 3600, 4800, 7200, 14400 |

TABLE 18-continued

Integer Factors for G = {1:30}

| G | A × N | Integer Factors (Possible Values of A and N) |
|---|---|---|
| 16 | 15360 | 1, 2, 3, 4, 5, 6, 8, 10, 12, 15, 16, 20, 24, 30, 32, 40, 48, 60, 64, 80, 96, 120, 128, 160, 192, 240, 256, 320, 384, 480, 512, 640, 768, 960, 1024, 1280, 1536, 1920, 2560, 3072, 3840, 5120, 7680, 15360 |
| 17 | 16320 | 1, 2, 3, 4, 5, 6, 8, 10, 12, 15, 16, 17, 20, 24, 30, 32, 34, 40, 48, 51, 60, 64, 68, 80, 85, 96, 102, 120, 136, 160, 170, 192, 204, 240, 255, 272, 320, 340, 408, 480, 510, 544, 680, 816, 960, 1020, 1088, 1360, 1632, 2040, 2720, 3264, 4080, 5440, 8160, 16320 |
| 18 | 17280 | 1, 2, 3, 4, 5, 6, 8, 9, 10, 12, 15, 16, 18, 20, 24, 27, 30, 32, 36, 40, 45, 48, 54, 60, 64, 72, 80, 90, 96, 108, 120, 128, 135, 144, 160, 180, 192, 216, 240, 270, 288, 320, 360, 384, 432, 480, 540, 576, 640, 720, 864, 960, 1080, 1152, 1440, 1728, 1920, 2160, 2880, 3456, 4320, 5760, 8640 17280 |
| 19 | 18240 | 1, 2, 3, 4, 5, 6, 8, 10, 12, 15, 16, 19, 20, 24, 30, 32, 38, 40, 48, 57, 60, 64, 76, 80, 95, 96, 114, 120, 152, 160, 190, 192, 228, 240, 285, 304, 320, 380, 456, 480, 570, 608, 760, 912, 960, 1140, 1216, 1520, 1824, 2280, 3040, 3648, 4560, 6080, 9120, 18240 |
| 20 | 19200 | 1, 2, 3, 4, 5, 6, 8, 10, 12, 15, 16, 20, 24, 25, 30, 32, 40, 48, 50, 60, 64, 75, 80, 96, 100, 120, 128, 150, 160, 192, 200, 240, 256, 300, 320, 384, 400, 480, 600, 640, 768, 800, 960, 1200, 1280, 1600, 1920, 2400, 3200, 3840, 4800, 6400, 9600, 19200 |
| 21 | 20160 | 1, 2, 3, 4, 5, 6, 7, 8, 9, 10, 12, 14, 15, 16, 18, 20, 21, 24, 28, 30, 32, 35, 36, 40, 42, 45, 48, 56, 60, 63, 64, 70, 72, 80, 84, 90, 96, 105, 112, 120, 126, 140, 144, 160, 168, 180, 192, 210, 224, 240, 252, 280, 288, 315, 320, 336, 360, 420, 448, 480, 504, 560, 576, 630, 672, 720, 840, 960, 1008, 1120, 1260, 1344, 1440, 1680, 2016, 2240, 2520, 2880, 3360, 4032, 5040, 6720, 10080, 20160 |
| 22 | 21120 | 1, 2, 3, 4, 5, 6, 8, 10, 11, 12, 15, 16, 20, 22, 24, 30, 32, 33, 40, 44, 48, 55, 60, 64, 66, 80, 88, 96, 110, 120, 128, 132, 160, 165, 176, 192, 220, 240, 264, 320, 330, 352, 384, 440, 480, 528, 640, 660, 704, 880, 960, 1056, 1320, 1408, 1760, 1920, 2112, 2640, 3520, 4224, 5280, 7040, 10560, 21120 |
| 23 | 22080 | 1, 2, 3, 4, 5, 6, 8, 10, 12, 15, 16, 20, 23, 24, 30, 32, 40, 46, 48, 60, 64, 69, 80, 92, 96, 115, 120, 138, 160, 184, 192, 230, 240, 276, 320, 345, 368, 460, 480, 552, 690, 736, 920, 960, 1104, 1380, 1472, 1840, 2208, 2760, 3680, 4416, 5520, 7360, 11040, 22080 |
| 24 | 23040 | 1, 2, 3, 4, 5, 6, 8, 9, 10, 12, 15, 16, 18, 20, 24, 30, 32, 36, 40, 45, 48, 60, 64, 72, 80, 90, 96, 120, 128, 144, 160, 180, 192, 240, 256, 288, 320, 360, 384, 480, 512, 576, 640, 720, 768, 960, 1152, 1280, 1440, 1536, 1920, 2304, 2560, 2880, 3840, 4608, 5760, 7680, 11520, 23040 |
| 25 | 24000 | 1, 2, 3, 4, 5, 6, 8, 10, 12, 15, 16, 20, 24, 25, 30, 32, 40, 48, 50, 60, 64, 75, 80, 96, 100, 120, 125, 150, 160, 192, 200, 240, 250, 300, 320, 375, 400, 480, 500, 600, 750, 800, 960, 1000, 1200, 1500, 1600, 2000, 2400, 3000, 4000, 4800, 6000, 8000, 12000, 24000 |
| 26 | 24960 | 1, 2, 3, 4, 5, 6, 8, 10, 12, 13, 15, 16, 20, 24, 26, 30, 32, 39, 40, 48, 52, 60, 64, 65, 78, 80, 96, 104, 120, 128, 130, 156, 160, 192, 195, 208, 240, 260, 312, 320, 384, 390, 416, 480, 520, 624, 640, 780, 832, 960, 1040, 1248, 1560, 1664, 1920, 2080, 2496, 3120, 4160, 4992, 6240, 8320, 12480, 24960 |
| 27 | 25920 | 1, 2, 3, 4, 5, 6, 8, 9, 10, 12, 15, 16, 18, 20, 24, 27, 30, 32, 36, 40, 45, 48, 54, 60, 64, 72, 80, 81, 90, 96, 108, 120, 135, 144, 160, 162, 180, 192, 216, 240, 270, 288, 320, 324, 360, 405, 432, 480, 540, 576, 648, 720, 810, 864, 960, 1080, 1296, 1440, 1620, 1728, 2160, 2592, 2880, 3240, 4320, 5184, 6480, 8640, 12960, 25920 |
| 28 | 26880 | 1, 2, 3, 4, 5, 6, 7, 8, 10, 12, 14, 15, 16, 20, 21, 24, 28, 30, 32, 35, 40, 42, 48, 56, 60, 64, 70, 80, 84, 96, 105, 112, 120, 128, 140, 160, 168, 192, 210, 224, 240, 256, 280, 320, 336, 384, 420, 448, 480, 560, 640, 672, 768, 840, 896, 960, 1120, 1280, 1344, 1680, 1792, 1920, 2240, 2688, 3360, 3840, 4480, 5376, 6720, 8960, 13440, 26880 |
| 29 | 27840 | 1, 2, 3, 4, 5, 6, 8, 10, 12, 15, 16, 20, 24, 29, 30, 32, 40, 48, 58, 60, 64, 80, 87, 96, 116, 120, 145, 160, 174, 192, 232, 240, 290, 320, 348, 435, 464, 480, 580, 696, 870, 928, 960, 1160, 1392, 1740, 1856, 2320, 2784, 3480, 4640, 5568, 6960, 9280, 13920, 27840 |
| 30 | 28800 | 1, 2, 3, 4, 5, 6, 8, 9, 10, 12, 15, 16, 18, 20, 24, 25, 30, 32, 36, 40, 45, 48, 50, 60, 64, 72, 75, 80, 90, 96, 100, 120, 128, 144, 150, 160, 180, 192, 200, 225, 240, 288, 300, 320, 360, 384, 400, 450, 480, 576, 600, 640, 720, 800, 900, 960, 1152, 1200, 1440, 1600, 1800, 1920, 2400, 2880, 3200, 3600, 4800, 5760, 7200, 9600, 14400, 28800 |

However, two conditions set the minimum number of appointments required:
1. There must be at least the number of appointments taken up by a packet (group size, G). In other words, the total number of appointments must be at least the number of appointments required for a single packet.
2. For each group size (G) there is a maximum packet payload size, $P_{max}$ that also sets a minimum number of appointments, A'. (The term A' is used because this is an interim value which is used to determine the actual minimum number of appointments required.)

$$\text{For } i = \{1:30\}, A'_i = \max\left(G_i, \frac{F \times G_i \times SI}{P_{\max i} \times 0.125}\right) = \qquad (30)$$

$$\max\left(G_i, \frac{F \times G_i \times 960}{P_{\max i}}\right) \text{or specifically,}$$

$$A'_1 = \max\left(1, \frac{F \times 960}{P_{\max 1}}\right)$$

$$A'_2 = \max\left(2, \frac{F \times 1920}{P_{\max 2}}\right)$$

$$A'_3 = \max\left(3, \frac{F \times 2880}{P_{\max 3}}\right)$$

$$\ldots$$

$$A'_{29} = \max\left(29, \frac{F \times 27840}{P_{\max 5}}\right)$$

$$A'_{30} = \max\left(30, \frac{F \times 28800}{P_{\max 6}}\right)$$

The maximum packet payload size ($P_{max}$) for each of the 30 group sizes of appointments is limited by the number of payload bytes that the packet can support. Table 19 shows the maximum capacity of TDM payload per scheduled packet ($P_{max}$) for each of the appointment group sizes. A group size (G) of 1 appointment, consisting of just 50 bytes, is not large enough to transport 82 bytes of overhead (Assumption 5) and some payload; therefore, only group sizes of 2 through 30 are considered in the following table.

TABLE 19

Maximum Packet Payloads ($P_{max}$) vs. Appointment Groups per Packet (G)

| G | $P_{max}$ (in Bytes) | Minimum Appts (A') |
|---|---|---|
| 2 | $P_{max2}$ = (100 − 82) = 18 | $A'_2$ = max(2, F*1920/18) |
| 3 | $P_{max3}$ = $P_{max2}$ + 50 = 68 | $A'_3$ = max(3, F*2880/68) |
| 4 | $P_{max4}$ = $P_{max3}$ + 50 = 118 | $A'_4$ = max(4, F*3840/118) |
| 5 | $P_{max5}$ = 168 | $A'_5$ = max(5, F*4800/168) |
| 6 | $P_{max6}$ = 218 | $A'_6$ = max(6, F*5760/218) |
| 7 | $P_{max7}$ = 268 | $A'_7$ = max(7, F*6720/268) |
| 8 | $P_{max8}$ = 318 | $A'_8$ = max(8, F*7680/318) |
| 9 | $P_{max9}$ = 368 | $A'_9$ = max(9, F*8640/368) |
| 10 | $P_{max10}$ = 418 | $A'_{10}$ = max(10, F*9600/418) |
| 11 | $P_{max11}$ = 468 | $A'_{11}$ = max(11, F*10560/468) |
| 12 | $P_{max12}$ = 518 | $A'_{12}$ = max(12, F*11520/518) |
| 13 | $P_{max13}$ = 568 | $A'_{13}$ = max(13, F*12480/568) |
| 14 | $P_{max14}$ = 618 | $A'_{14}$ = max(14, F*13440/618) |
| 15 | $P_{max15}$ = 668 | $A'_{15}$ = max(15, F*14400/668) |
| 16 | $P_{max16}$ = 718 | $A'_{16}$ = max(16, F*15360/718) |
| 17 | $P_{max17}$ = 768 | $A'_{17}$ = max(17, F*16320/768) |
| 18 | $P_{max18}$ = 818 | $A'_{18}$ = max(18, F*17280/818) |
| 19 | $P_{max19}$ = 868 | $A'_{19}$ = max(19, F*18240/868) |
| 20 | $P_{max20}$ = 918 | $A'_{20}$ = max(20, F*19200/918) |
| 21 | $P_{max21}$ = 968 | $A'_{21}$ = max(21, F*20160/968) |
| 22 | $P_{max22}$ = 1018 | $A'_{22}$ = max(22, F*21120/1018) |
| 23 | $P_{max23}$ = 1068 | $A'_{23}$ = max(23, F*22080/1068) |
| 24 | $P_{max24}$ = 1118 | $A'_{24}$ = max(24, F*23040/1118) |
| 25 | $P_{max25}$ = 1168 | $A'_{25}$ = max(25, F*24000/1168) |
| 26 | $P_{max26}$ = 1218 | $A'_{26}$ = max(26, F*24960/1218) |
| 27 | $P_{max27}$ = 1268 | $A'_{27}$ = max(27, F*25920/1268) |
| 28 | $P_{max28}$ = 1318 | $A'_{28}$ = max(28, F*26880/1318) |
| 29 | $P_{max29}$ = 1368 | $A'_{29}$ = max(29, F*27840/1368) |
| 30 | $P_{max30}$ = 1418 | $A'_{39}$ = max(30, F*28800/1418) |

Delay and Efficiency Considerations

Equations (28) through (30) in the previous section may result in up to 29 possible values of the total minimum number of appointments per schedule interval (A), the number of TDM frames per IP packet (F), and Appointments per packet (G). The final selection is made by choosing a balance between Packetization Delay, Schedule Efficiency, and Bandwidth Efficiency.

Equations (21) and (23) can be used to determine the Packetization Delay and Bandwidth Efficiency. Equation (22) can be simplified by substituting the schedule parameters assumed in this section, namely a Schedule Interval (SI) of 120 ms, and an Appointment Size (Appt_Size) of 50 bytes. The schedule efficiency (Sched_Eff) can then be calculated by Equation (31):

$$\text{Sched\_Eff} = \frac{F \times SI}{A \times \text{Appt\_Size} \times 0.125} = \frac{F \times 120}{A \times 50 \times 0.125} = \frac{19.2 \times F}{A} \qquad (31)$$

TDM Circuit Example

Again, consider the E1 circuit, which is used extensively outside of the U.S. The E1 bit rate, including overhead, is 2.048 Mbps. Therefore F=32 bytes every 125 μs. Equations (21), (23), (29), (30), and (31) and Table 19 are then used to calculate the values shown in Table 20 below.

Although there are two resulting configurations in Table 20 that have the highest Schedule Efficiency (G=21 and G=28, each with 672 appointments), the former has lower bandwidth efficiency but less packetization delay. The choice can be made depending upon overall efficiency and delay requirements. If packetization delay needs to be even lower, other choices, such as G=12 (720 appointments) or G=17 (680 appointments) may be preferable.

TABLE 20

Example: E1 Circuit - Synchronous Method with Schedule Interval = 120 ms and Appointment Size = 50 bytes

| G | A × N | $P_{max}$ | A' | A | N | Schedule Efficiency | Bandwidth Efficiency | Packetization Delay |
|---|---|---|---|---|---|---|---|---|
| 2 | 1920 | 18 | 3413.33 | — | — | — | — | — |
| 3 | 2880 | 68 | 1355.29 | 1440 | 2 | 42.7% | 59.3% | 0.25 ms |
| 4 | 3840 | 118 | 1041.36 | 1280 | 3 | 48.0% | 68.6% | 0.38 ms |
| 5 | 4800 | 168 | 914.29 | 960 | 5 | 64.0% | 78.4% | 0.63 ms |
| 6 | 5760 | 218 | 845.50 | 960 | 6 | 64.0% | 81.4% | 0.75 ms |
| 7 | 6720 | 268 | 802.39 | 840 | 8 | 73.1% | 85.3% | 1.00 ms |
| 8 | 7680 | 318 | 772.83 | 960 | 8 | 64.0% | 85.3% | 1.00 ms |

TABLE 20-continued

Example: E1 Circuit - Synchronous Method with Schedule Interval = 120 ms and Appointment Size = 50 bytes

| G | A × N | P$_{max}$ | A' | A | N | Schedule Efficiency | Bandwidth Efficiency | Packetization Delay |
|---|---|---|---|---|---|---|---|---|
| 9 | 8640 | 368 | 751.30 | 864 | 10 | 71.1% | 87.9% | 1.25 ms |
| 10 | 9600 | 418 | 734.93 | 800 | 12 | 76.8% | 89.7% | 1.50 ms |
| 11 | 10560 | 468 | 722.05 | 880 | 12 | 69.8% | 89.7% | 1.50 ms |
| 12 | 11520 | 518 | 711.66 | 720 | 16 | 85.3% | 92.1% | 2.00 ms |
| 13 | 12480 | 568 | 793.10 | 780 | 16 | 78.8% | 92.1% | 2.00 ms |
| 14 | 13440 | 618 | 695.92 | 840 | 16 | 73.1% | 92.1% | 2.00 ms |
| 15 | 14400 | 668 | 689.82 | 720 | 20 | 85.3% | 93.6% | 2.50 ms |
| 16 | 15360 | 718 | 684.57 | 768 | 20 | 80.0% | 93.6% | 2.50 ms |
| 17 | 16320 | 768 | 680.00 | 680 | 24 | 90.4% | 94.6% | 3.00 ms |
| 18 | 17280 | 818 | 675.99 | 720 | 24 | 85.3% | 94.6% | 3.00 ms |
| 19 | 18240 | 868 | 672.44 | 760 | 24 | 80.8% | 94.6% | 3.00 ms |
| 20 | 19200 | 918 | 669.28 | 768 | 25 | 80.0% | 94.8% | 3.13 ms |
| 21 | 20160 | 968 | 666.45 | 672 | 30 | 91.4% | 95.6% | 3.75 ms |
| 22 | 21120 | 1018 | 663.89 | 704 | 30 | 87.3% | 95.6% | 3.75 ms |
| 23 | 22080 | 1068 | 661.57 | 690 | 32 | 89.0% | 95.9% | 4.00 ms |
| 24 | 23040 | 1118 | 659.46 | 720 | 32 | 85.3% | 95.9% | 4.00 ms |
| 25 | 24000 | 1168 | 657.53 | 750 | 32 | 81.9% | 95.9% | 4.00 ms |
| 26 | 24960 | 1218 | 655.76 | 780 | 32 | 78.8% | 95.9% | 4.00 ms |
| 27 | 25920 | 1268 | 654.13 | 720 | 36 | 85.3% | 96.3% | 4.50 ms |
| 28 | 26880 | 1318 | 652.63 | 672 | 40 | 91.4% | 96.7% | 5.00 ms |
| 29 | 27840 | 1368 | 651.23 | 696 | 40 | 88.3% | 96.7% | 5.00 ms |
| 30 | 28800 | 1418 | 649.93 | 720 | 40 | 85.3% | 96.7% | 5.00 ms |

Figure 3:
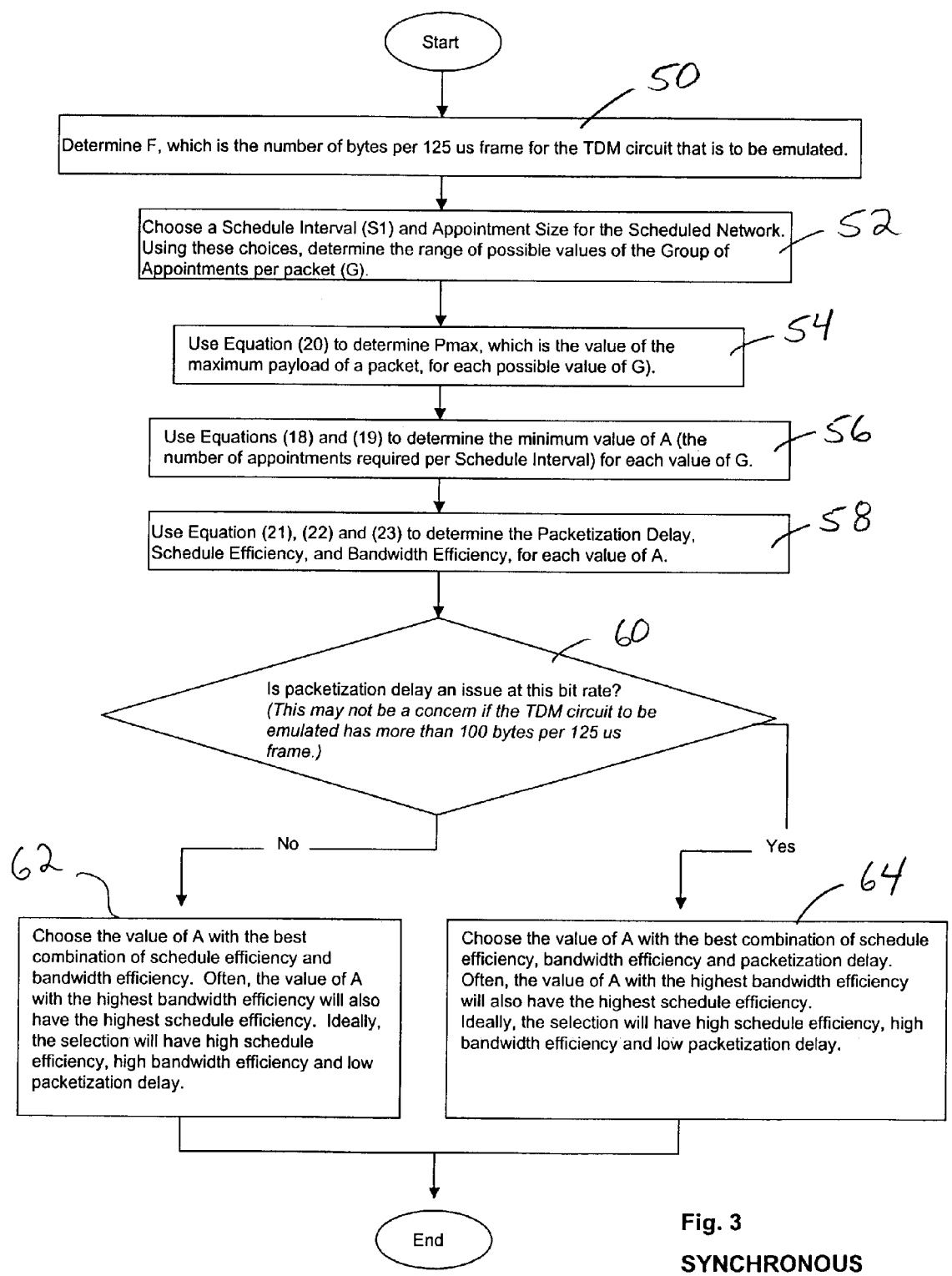
FIG. 3 is a process flow diagram for determining the minimum required number of appointments for any TDM circuit according to an alternative general synchronous method embodiment of the present invention.

Those skilled in the art can readily determine the formulas for other values of scheduling parameters in view hereof. Those skilled in the art now have enough information to determine the minimum required number of appointments for a TDM circuit. The steps to the process for determining the minimum number of required appointments are shown in FIG. 3 for the synchronous method.

First, the number of bytes per 125 μs frame is determined 50. Next, schedule interval (SI) and appointment size is chosen 52. The range of possible values of group appointments per packet (packet size) is determined based on the chosen schedule interval and appointment size. The value of the maximum payload of a packet (Pmax) for each possible packet size is determined 54. The minimum number of appointments required per schedule interval (A) is then determined for each packet size 56. The packetization delay, schedule efficiency and bandwidth efficiency for each value of A is then determined 58.

Packetization delay is then considered 60. If packetization delay is an issue at this bit rate 62, then a value for the number of appointments required (A) is chosen with the best combination of schedule efficiency, bandwidth efficiency and packetization delay.

If packetization delay is not an issue at this bit rate, then a value for the number of appointments required (A) is chosen 64 with the best combination of schedule efficiency and bandwidth efficiency.

IID. Asynchronous Method—General Case

In the Asynchronous Method, TDM circuits are no longer synchronized to the scheduled network. One can theoretically choose any Accumulation Interval to accumulate bytes from TDM circuits into scheduled packets; the only restrictions are:

1. The number of accumulated bytes in the Accumulation Interval must be less than or equal to the payload of a maximum-sized packet; practical considerations of schedule efficiency can restrict this somewhat further, according to Assumption 4.

2. The resulting number of appointments must be within the capacity of the scheduled network. This restricts TDM circuits to bit rates that are lower than the interface speeds that they traverse on the scheduled network.

There is a more practical method than having an infinitely adjustable Accumulation Interval. For constant bit rate flows such as emulated TDM circuits, there are a constant number of packets per schedule interval. The Asynchronous Method calculates the minimum number of packets per schedule interval, which is limited by the maximum TDM circuit bit rate (relative to the scheduled network) and the maximum scheduled packet size.

Although TDM circuits have a constant bit rate, the Asynchronous Method assumes that the TDM circuit is not synchronized to the scheduled network. Therefore, the maximum TDM circuit bit rate relative to the scheduled network is calculated by using the following formula:

$$TDM\_BR_{max} = TDM\_BR_{nom} \times \left[1 - \left(\frac{\Delta TDM\_Clock_{max} + \Delta Accum\_Clock_{max}}{1000000}\right)\right] \quad (32)$$

TDM_BR$_{max}$ is the maximum bit rate of the TDM circuit, in bits/sec, relative to the scheduled network.

TDM_BR$_{nom}$ is the nominal bit rate of the TDM circuit, in bits/sec.

ΔTDM_Clock$_{max}$ is the maximum frequency drift of the TDM circuit clock, in parts per million (ppm). For example, if the accuracy of the TDM clock is ±50 ppm, then ΔTDM_Clock$_{max}$=50.

ΔAccum_Clock$_{max}$ is the maximum frequency drift of the Accumulator clock, in parts per million (ppm). For example, if the accuracy of the Accumulator clock is ±50 ppm, then ΔAccum_Clock$_{max}$=50.

The minimum number of packets per schedule interval is calculated by using the following formula:

$$K_{min} = \text{Roundup}\left[\frac{\text{TDM\_BR}_{max} \times SI}{P_{max} \times 8}\right] \quad (33)$$

SI is the Schedule Interval, in seconds.

$P_{max}$ is the maximum payload per scheduled packet (in bytes). $P_{max}$ depends on the maximum packet size on the scheduled network, which is calculated using Assumption 4, and the number of overhead bytes per packet (see Assumption 5).

Roundup is a function f(x) that rounds up the value "x" to the next highest integer that is greater than or equal to x.

$K_{min}$ is the minimum number of packets per Schedule Interval.

Once $K_{min}$ is calculated, larger integer values of K (the number of packets per schedule interval) are analyzed by incrementing K by 1, and calculating the following parameters:

Maximum Expected Packet Size (MEPS)
Required Number of appointments per schedule interval (A)
Group of appointments (G) per scheduled packet
Schedule Efficiency
Bandwidth Efficiency
Packetization Delay (also equal to the Accumulation Interval)

As with the Synchronous Method, the selection of parameters for the Asynchronous Method is made by choosing a balance between Packetization Delay, Schedule Efficiency, and Bandwidth Efficiency.

The Maximum Expected Packet Size (MEPS), in bytes, is calculated by the following equation:

$$MEPS = \text{Roundup}\left[\frac{\text{TDM\_BR}_{max} \times SI}{8 \times K}\right] + 78 \quad (34)$$

In the above equation, the roundup function Roundup(x) rounds up the value x to the smallest integer that is greater than or equal to x.

The number 82 represents the total number of overhead bytes per packet, as stated by Assumption 5. This includes the 4-byte TDM Control field, and overhead for: RTP (12 bytes); UDP (8 bytes); IP (20 bytes); and Ethernet (38 bytes, including Ethernet's 12-byte minimum interframe gap).

The total number of appointments required (A) per Schedule Interval is calculated by the following equation:

$$A = K \times \text{Roundup}\left[\frac{MEPS}{\text{Appt\_Size}}\right] \quad (35)$$

In the above equation, the roundup function Roundup(x) rounds up the value x to the smallest integer that is greater than or equal to x. Appt_Size is the appointment size of scheduled network, in bytes.

The group of appointments (G) per scheduled packet is simply the total number of appointments required per Schedule Interval divided by the number of packets per Schedule Interval, or G=A/K.

The Schedule Efficiency is the ratio of the original TDM circuit bit rate to the amount of bandwidth reserved by the total number of appointments in its itinerary over a scheduled packet network. The Schedule Efficiency (Sched_Eff) can be calculated by the following equation:

$$\text{Sched\_Eff} = \frac{\text{TDM\_BR}_{nom} \times SI}{\text{Appt\_Size} \times A} \quad (36)$$

The Bandwidth Efficiency across the scheduled IP network is the ratio of the original TDM circuit bit rate to the bit rate of the scheduled packet, including IP and higher layer (e.g., UDP) overhead. The Bandwidth Efficiency (BW_Eff) can be calculated by the following equation:

$$\text{BW\_Eff} = \frac{\text{TDM\_BR}_{nom} \times SI}{\text{TDM\_BR}_{nom} \times SI + (\text{Max\_IP\_Overhead} \times 8 \times K)} = \frac{\text{TDM\_BR}_{nom} \times SI}{\text{TDM\_BR}_{nom} \times SI \times (44 \times 8 \times K)} \quad (37)$$

The number 44 represents the maximum total number of packet overhead bytes at or above the IP layer. According to Assumption 5, this includes IP overhead (20 bytes), UDP (8 bytes), RTP (12 bytes), and TDM Control (4 bytes). This does not include overhead specific to a physical interface layer, such as Ethernet.

The Packetization Delay is the same as the Accumulation Interval, and can be calculated using the number of packets per schedule interval:

$$\text{Packetization\_Delay} = \text{Accumulation\_Interval} = \frac{SI}{K} \quad (38)$$

Two illustrative examples of the Synchronous Method are described in detail in the following sections for two different sets of scheduling parameters. As mentioned previously, those skilled in the art can readily determine the formulas for other values of scheduling parameters.

IIE. The Asynchronous Method with 20 ms Schedule Intervals and 250-Byte Appointments as Derived From the General Methodolgy.

According to Assumption 4a, the maximum IP packet size with a 20 ms (0.02 seconds) Schedule Interval and 250-byte Appointments is assumed to be 1462 bytes. According to Assumption 5, there is assumed to be 44 overhead bytes at or above the IP layer, per packet. This includes IP overhead (20 bytes), UDP (8 bytes), RTP (12 bytes), and TDM Control (4 bytes). Therefore, the maximum payload per scheduled packet ($P_{max}$) is 1462−44=1418 bytes.

Equations (33–38) can now be simplified in order to calculate the following parameters:

$K_{min}$ (the minimum number of packets per Schedule Interval)
Maximum Expected Packet Size (MEPS)
Required Number of appointments per schedule interval (A)
Group of appointments (G) per scheduled packet
Schedule Efficiency (Sched_Eff)
Bandwidth Efficiency (BW_Eff)

Packetization Delay (also equal to the Accumulation Interval)

$$K_{min} = \text{Roundup}\left[\frac{TDM\_BR_{max} \times 0.02}{1418 \times 8}\right] = \text{Roundup}\left[\frac{TDM\_BR_{max}}{567200}\right] \quad (39)$$

$$MEPS = \text{Roundup}\left[\frac{TDM\_BR_{max} \times 0.02}{8 \times K}\right] + 82 \quad (40)$$

$$A = K \times \text{Roundup}\left[\frac{MEPS}{250}\right] \quad (41)$$

$$\text{Sched\_Eff} = \frac{TDM\_BR_{nom}}{100000 \times A} \quad (42)$$

$$\text{BW\_Eff} = \frac{TDM\_BR_{nom} \times 0.02}{TDM\_BR_{nom} \times 0.02 + (352 \times K)} = \frac{TDM\_BR_{nom}}{TDM\_BR_{nom} + (17600 \times K)} \quad (43)$$

$$\text{Packetization\_Delay} = \text{Accumulation\_Interval} = \frac{20 \text{ ms}}{K} \quad (44)$$

Consider the E1 circuit, 2.048 Mbps, where the entire E1 bit rate, including TDM overhead, is mapped into scheduled packets. A table of possible system parameters can be created, once the clock accuracies are known. The following assumption will be made to proceed with the example; however, the present method can be used with any clock accuracies:

Assume $\Delta TDM\_Clock_{max} + \Delta Accum\_Clock_{max} = 150$ ppm

The clock accuracies can be substituted into Equation (32) to determine the maximum TDM circuit bit rate relative to the scheduled network:

$$TDM\_BR_{max} = \quad (45)$$
$$2048000 \times \left[1 + \left(\frac{150}{1000000}\right)\right] = 2048307.2 \text{ bps}$$

This resulting $TDM\_BR_{max}$ is substituted into Equation (25) to determine $K_{min}$ (the minimum number of packets per Schedule Interval):

$$K_{min} = \text{Roundup}\left[\frac{2048307.2}{567200}\right] = \text{Roundup}[3.61] = 4 \quad (46)$$

A table of parameters can now be created using various values of K ($K \geq K_{min}$) using Equations (26–30); an illustrative example is shown in Table 21. It is now a simple matter of choosing the value of K with the best Schedule Efficiency and Bandwidth Efficiency, that meets the customer's packetization delay requirements.

Several more examples are shown in Table 22 for other common TDM circuits. The Asynchronous Method is in no way limited to the values shown in Tables 21 and 22. Many more combinations are possible.

TABLE 21

Example Schedule Parameters for E1 Circuits, Asynchronous Method, with 20 ms Schedule Intervals and 250-byte Appointments

| Packets per Schedule Interval (K) | Maximum Expected Packet Size | Total Appts. (A) | Schedule Efficiency | Bandwidth Efficiency | Packetization Delay |
|---|---|---|---|---|---|
| 4 | 1363 bytes | 24 | 85.3% | 96.7% | 5.00 ms |
| 5 | 1107 bytes | 25 | 81.9% | 95.9% | 4.00 ms |
| 6 | 936 bytes | 24 | 85.3% | 95.1% | 3.33 ms |
| 7 | 814 bytes | 28 | 73.1% | 94.3% | 2.86 ms |
| 8 | 723 bytes | 24 | 85.3% | 93.6% | 2.50 ms |
| 9 | 651 bytes | 27 | 75.9% | 92.8% | 2.22 ms |
| 10 | 595 bytes | 30 | 68.3% | 92.1% | 2.00 ms |
| 11 | 548 bytes | 33 | 62.1% | 91.4% | 1.82 ms |
| 12 | 509 bytes | 36 | 56.9% | 90.7% | 1.67 ms |
| 13 | 476 bytes | 26 | 78.8% | 90.0% | 1.54 ms |
| 14 | 448 bytes | 28 | 73.1% | 89.3% | 1.43 ms |
| 15 | 424 bytes | 30 | 68.3% | 88.6% | 1.33 ms |
| 16 | 403 bytes | 32 | 64.0% | 87.9% | 1.25 ms |
| 17 | 384 bytes | 34 | 60.2% | 87.3% | 1.18 ms |
| 18 | 367 bytes | 36 | 56.9% | 86.6% | 1.11 ms |
| 19 | 352 bytes | 38 | 53.9% | 86.0% | 1.05 ms |
| 20 | 339 bytes | 40 | 51.2% | 85.3% | 1.00 ms |
| 21 | 326 bytes | 42 | 48.8% | 84.7% | 0.95 ms |
| 22 | 315 bytes | 44 | 46.5% | 84.1% | 0.91 ms |
| 23 | 305 bytes | 46 | 44.5% | 83.5% | 0.87 ms |
| 24 | 296 bytes | 48 | 42.7% | 82.9% | 0.83 ms |
| 25 | 287 bytes | 50 | 41.0% | 82.3% | 0.80 ms |
| 26 | 279 bytes | 52 | 39.4% | 81.7% | 0.77 ms |
| 27 | 272 bytes | 54 | 37.9% | 81.2% | 0.74 ms |
| 28 | 265 bytes | 56 | 36.6% | 80.6% | 0.71 ms |
| 29 | 259 bytes | 58 | 35.3% | 80.1% | 0.69 ms |
| 30 | 253 bytes | 60 | 34.1% | 79.5% | 0.67 ms |

TABLE 21-continued

Example Schedule Parameters for E1 Circuits, Asynchronous Method,
with 20 ms Schedule Intervals
and 250-byte Appointments

| Packets per Schedule Interval (K) | Maximum Expected Packet Size | Total Appts. (A) | Schedule Efficiency | Bandwidth Efficiency | Packetization Delay |
|---|---|---|---|---|---|
| 31 | 248 bytes | 31 | 66.1% | 79.0% | 0.65 ms |
| 32 | 243 bytes | 32 | 64.0% | 78.4% | 0.63 ms |
| 33 | 238 bytes | 33 | 62.1% | 77.9% | 0.61 ms |
| 34 | 233 bytes | 34 | 60.2% | 77.4% | 0.59 ms |
| 35 | 229 bytes | 35 | 58.5% | 76.9% | 0.57 ms |

TABLE 22

Examples of TDM Circuit Mappings - Asynchronous Method with 20 ms
Schedule Interval, 50-byte Appointments

| TDM Circuit Bit Rate to be Scheduled | Packets per Schedule Interval | Maximum Expected Packet Size | Appts. per Packet | Total Ap-pts. | Schedule Efficiency | Bandwidth Efficiency | Packetization Delay |
|---|---|---|---|---|---|---|---|
| DS-1 1.544 Mbps | 3 | 1369 bytes | 6 | 18 | 85.8% | 96.7% | 6.67 ms |
| | 4 | 1048 bytes | 5 | 20 | 77.2% | 95.6% | 5.00 ms |
| | 5 | 855 bytes | 4 | 20 | 77.2% | 94.6% | 4.00 ms |
| | 6 | 726 bytes | 3 | 18 | 85.8% | 93.6% | 3.33 ms |
| | 7 | 634 bytes | 3 | 21 | 73.5% | 92.6% | 2.86 ms |
| | 8 | 565 bytes | 3 | 24 | 64.3% | 91.6% | 2.50 ms |
| | 9 | 511 bytes | 3 | 27 | 57.2% | 90.7% | 2.22 ms |
| | 10 | 469 bytes | 2 | 20 | 77.2% | 89.8% | 2.00 ms |
| | 11 | 433 bytes | 2 | 22 | 70.2% | 88.9% | 1.82 ms |
| | 12 | 404 bytes | 2 | 24 | 64.3% | 88.0% | 1.67 ms |
| | 13 | 379 bytes | 2 | 26 | 59.4% | 87.1% | 1.54 ms |
| | 14 | 358 bytes | 2 | 28 | 55.1% | 86.2% | 1.43 ms |
| | 15 | 340 bytes | 2 | 30 | 51.5% | 85.4% | 1.33 ms |
| | 16 | 324 bytes | 2 | 32 | 48.3% | 84.6% | 1.25 ms |
| | 17 | 310 bytes | 2 | 34 | 45.4% | 83.8% | 1.18 ms |
| | 18 | 297 bytes | 2 | 36 | 42.9% | 83.0% | 1.11 ms |
| | 19 | 286 bytes | 2 | 38 | 40.6% | 82.2% | 1.05 ms |
| | 20 | 276 bytes | 2 | 40 | 38.6% | 81.4% | 1.00 ms |
| | 21 | 266 bytes | 2 | 42 | 36.8% | 80.7% | 0.95 ms |
| | 22 | 258 bytes | 2 | 44 | 35.1% | 80.0% | 0.91 ms |
| | 23 | 250 bytes | 1 | 23 | 67.1% | 79.2% | 0.87 ms |
| | 24 | 243 bytes | 1 | 24 | 64.3% | 78.5% | 0.83 ms |
| | 25 | 237 bytes | 1 | 25 | 61.8% | 77.8% | 0.80 ms |
| E3 34.368 Mbps | 61 | 1491 bytes | 6 | 366 | 93.9% | 97.0% | 0.33 ms |
| | 62 | 1469 bytes | 6 | 372 | 92.4% | 96.9% | 0.32 ms |
| | 63 | 1447 bytes | 6 | 378 | 90.9% | 96.9% | 0.32 ms |
| | 64 | 1425 bytes | 6 | 384 | 89.5% | 96.8% | 0.31 ms |
| | 65 | 1405 bytes | 6 | 390 | 88.1% | 96.8% | 0.31 ms |
| | 66 | 1385 bytes | 6 | 396 | 86.8% | 96.7% | 0.30 ms |
| | 67 | 1365 bytes | 6 | 402 | 85.5% | 96.7% | 0.30 ms |
| | 68 | 1346 bytes | 6 | 408 | 84.2% | 96.6% | 0.29 ms |
| | 69 | 1328 bytes | 6 | 414 | 83.0% | 96.6% | 0.29 ms |
| | 70 | 1310 bytes | 6 | 420 | 81.8% | 96.5% | 0.29 ms |
| | 71 | 1293 bytes | 6 | 426 | 80.7% | 96.5% | 0.28 ms |
| | 72 | 1276 bytes | 6 | 432 | 79.6% | 96.4% | 0.28 ms |
| | 73 | 1260 bytes | 6 | 438 | 78.5% | 96.4% | 0.27 ms |
| | 74 | 1244 bytes | 5 | 370 | 92.9% | 96.3% | 0.27 ms |
| | 75 | 1228 bytes | 5 | 375 | 91.6% | 96.3% | 0.27 ms |
| DS-3 44.736 Mbps | 79 | 1498 bytes | 6 | 474 | 94.4% | 97.0% | 0.25 ms |
| | 80 | 1481 bytes | 6 | 480 | 93.2% | 96.9% | 0.25 ms |
| | 81 | 1463 bytes | 6 | 486 | 92.0% | 96.9% | 0.25 ms |
| | 82 | 1447 bytes | 6 | 492 | 90.9% | 96.9% | 0.24 ms |
| | 83 | 1430 bytes | 6 | 498 | 89.8% | 96.8% | 0.24 ms |
| | 84 | 1414 bytes | 6 | 504 | 88.8% | 96.8% | 0.24 ms |
| | 85 | 1398 bytes | 6 | 510 | 87.7% | 96.8% | 0.24 ms |
| | 86 | 1383 bytes | 6 | 516 | 86.7% | 96.7% | 0.23 ms |
| | 87 | 1368 bytes | 6 | 522 | 85.7% | 96.7% | 0.23 ms |

TABLE 22-continued

Examples of TDM Circuit Mappings - Asynchronous Method with 20 ms Schedule Interval, 50-byte Appointments

| TDM Circuit Bit Rate to be Scheduled | Packets per Schedule Interval | Maximum Expected Packet Size | Appts. per Packet | Total Ap- | Schedule Efficiency | Bandwidth Efficiency | Packetization Delay |
|---|---|---|---|---|---|---|---|
| | 88 | 1354 bytes | 6 | 528 | 84.7% | 96.7% | 0.23 ms |
| | 89 | 1339 bytes | 6 | 534 | 83.8% | 96.6% | 0.22 ms |
| | 90 | 1325 bytes | 6 | 540 | 82.8% | 96.6% | 0.22 ms |
| | 91 | 1312 bytes | 6 | 546 | 81.9% | 96.5% | 0.22 ms |
| | 92 | 1298 bytes | 6 | 552 | 81.0% | 96.5% | 0.22 ms |
| | 93 | 1285 bytes | 6 | 558 | 80.2% | 96.5% | 0.22 ms |
| | 94 | 1272 bytes | 6 | 564 | 79.3% | 96.4% | 0.21 ms |
| | 95 | 1260 bytes | 6 | 570 | 78.5% | 96.4% | 0.21 ms |
| | 96 | 1248 bytes | 5 | 480 | 93.2% | 96.4% | 0.21 ms |
| | 97 | 1236 bytes | 5 | 485 | 92.2% | 96.3% | 0.21 ms |
| | 98 | 1224 bytes | 5 | 490 | 91.3% | 96.3% | 0.20 ms |
| | 99 | 1212 bytes | 5 | 495 | 90.4% | 96.3% | 0.20 ms |
| | 100 | 1201 bytes | 5 | 500 | 89.5% | 96.2% | 0.20 ms |
| EC-1 | 92 | 1491 bytes | 6 | 552 | 93.9% | 97.0% | 0.22 ms |
| (STS-1) | 93 | 1476 bytes | 6 | 558 | 92.9% | 96.9% | 0.22 ms |
| 51.840 Mbps | 94 | 1461 bytes | 6 | 564 | 91.9% | 96.9% | 0.21 ms |
| | 95 | 1447 bytes | 6 | 570 | 90.9% | 96.9% | 0.21 ms |
| | 96 | 1433 bytes | 6 | 576 | 90.0% | 96.8% | 0.21 ms |
| | 97 | 1419 bytes | 6 | 582 | 89.1% | 96.8% | 0.21 ms |
| | 98 | 1405 bytes | 6 | 588 | 88.2% | 96.8% | 0.20 ms |
| | 99 | 1392 bytes | 6 | 594 | 87.3% | 96.7% | 0.20 ms |
| | 100 | 1379 bytes | 6 | 600 | 86.4% | 96.7% | 0.20 ms |
| | 101 | 1366 bytes | 6 | 606 | 85.5% | 96.7% | 0.20 ms |
| | 102 | 1353 bytes | 6 | 612 | 84.7% | 96.7% | 0.20 ms |
| | 103 | 1341 bytes | 6 | 618 | 83.9% | 96.6% | 0.19 ms |
| | 104 | 1329 bytes | 6 | 624 | 83.1% | 96.6% | 0.19 ms |
| | 105 | 1317 bytes | 6 | 630 | 82.3% | 96.6% | 0.19 ms |
| | 106 | 1305 bytes | 6 | 636 | 81.5% | 96.5% | 0.19 ms |
| | 107 | 1294 bytes | 6 | 642 | 80.7% | 96.5% | 0.19 ms |
| | 108 | 1283 bytes | 6 | 648 | 80.0% | 96.5% | 0.19 ms |
| | 109 | 1272 bytes | 6 | 654 | 79.3% | 96.4% | 0.18 ms |
| | 110 | 1261 bytes | 6 | 660 | 78.5% | 96.4% | 0.18 ms |
| | 111 | 1250 bytes | 5 | 555 | 93.4% | 96.4% | 0.18 ms |
| | 112 | 1240 bytes | 5 | 560 | 92.6% | 96.3% | 0.18 ms |
| OC-3/STM-1 | 275 | 1497 bytes | 6 | 1650 | 94.3% | 97.0% | 0.07 ms |
| 155.520 Mbps | 276 | 1491 bytes | 6 | 1656 | 93.9% | 97.0% | 0.07 ms |
| | 277 | 1486 bytes | 6 | 1662 | 93.6% | 97.0% | 0.07 ms |
| | 278 | 1481 bytes | 6 | 1668 | 93.2% | 96.9% | 0.07 ms |
| | 279 | 1476 bytes | 6 | 1674 | 92.9% | 96.9% | 0.07 ms |
| | 280 | 1471 bytes | 6 | 1680 | 92.6% | 96.9% | 0.07 ms |
| | 281 | 1466 bytes | 6 | 1686 | 92.2% | 96.9% | 0.07 ms |
| | 282 | 1461 bytes | 6 | 1692 | 91.9% | 96.9% | 0.07 ms |
| | 283 | 1457 bytes | 6 | 1698 | 91.6% | 96.9% | 0.07 ms |
| | 330 | 1261 bytes | 6 | 1980 | 78.5% | 96.4% | 0.06 ms |
| | 331 | 1257 bytes | 6 | 1986 | 78.3% | 96.4% | 0.06 ms |
| | 332 | 1254 bytes | 6 | 1992 | 78.1% | 96.4% | 0.06 ms |
| | 333 | 1250 bytes | 5 | 1665 | 93.4% | 96.4% | 0.06 ms |
| | 334 | 1247 bytes | 5 | 1670 | 93.1% | 96.4% | 0.06 ms |
| | 335 | 1243 bytes | 5 | 1675 | 92.8% | 96.3% | 0.06 ms |

IIF. The Asynchronous Method with 120 ms Schedule Intervals and 50-Byte Appointments as Derived From the General Methodology According to Assumption 4b, the maximum IP packet size with a 120 ms (0.12 seconds) Schedule Interval and 50-byte Appointments is assumed to be 1462 bytes. According to Assumption 5, there is assumed to be 44 overhead bytes at or above the IP layer, per packet. This includes IP overhead (20 bytes), UDP (8 bytes), RTP (12 bytes), and TDM Control (4 bytes). Therefore, the maximum payload per scheduled packet ($P_{max}$) is 1462−44=1418 bytes.

Equations (33–38) can now be simplified in order to calculate the following parameters:

$K_{min}$ (the minimum number of packets per Schedule Interval)

Maximum Expected Packet Size (MEPS)

Required Number of appointments per schedule interval (A)

Group of appointments (G) per scheduled packet

Schedule Efficiency (Sched_Eff)

Bandwidth Efficiency (BW_Eff)

Packetization Delay (also equal to the Accumulation Interval)

$$K_{min} = \text{Roundup}\left[\frac{TDM\_BR_{max} \times 0.12}{1418 \times 8}\right] = \text{Roundup}\left[\frac{TDM\_BR_{max} \times 0.12}{11344}\right] \quad (47)$$

$$MEPS = \text{Roundup}\left[\frac{TDM\_BR_{max} \times 0.12}{8 \times K}\right] + 82 \quad (48)$$

$$A = K \times \text{Roundup}\left[\frac{MEPS}{50}\right] \quad (49)$$

$$\text{Sched\_Eff} = \frac{TDM\_BR_{nom}}{100000 \times A} \quad (50)$$

$$\text{BW\_Eff} = \frac{TDM\_BR_{nom} \times 0.12}{TDM\_BR_{nom} \times 0.12 + (352 \times K)} \quad (51)$$

$$\text{Packetization\_Delay} = \text{Accumulation\_Interval} = \frac{120 \text{ ms}}{K} \quad (52)$$

Consider the E1 circuit, 2.048 Mbps, where the entire E1 bit rate, including TDM overhead, is mapped into scheduled packets. A table of possible system parameters can be created, once the clock accuracies are known. The following assumption will be made to proceed with the example; however, the present method can be used with any clock accuracies:

Assume $\Delta TDM\_Clock_{max} + \Delta Accum\_Clock_{max} = 150$ ppm

The clock accuracies can be substituted into Equation (32) to determine the maximum TDM circuit bit rate relative to the scheduled network:

$$TDM\_BR_{max} = 2048000 \times \left[1 + \left(\frac{150}{1000000}\right)\right] = 2048307.2 \text{ bps} \quad (53)$$

This resulting $TDM\_BR_{max}$ is substituted into Equation (47) to determine $K_{min}$ (the minimum number of packets per Schedule Interval):

$$K_{min} = \text{Roundup}\left[\frac{2048307.2 \times 0.12}{1418 \times 8}\right] = \text{Roundup}[21.67] = 22 \quad (54)$$

A table of parameters can now be created using various values of K ($K \geq K_{min}$) using equations (34–38); an illustrative example is shown in Table 23. It is now a simple matter of choosing the value of K with the best Schedule Efficiency and bandwidth efficiency that meets the customer's packetization delay requirements.

TABLE 23

Example Schedule Parameters for E1 Circuits, Asynchronous Method, with 120 ms Schedule Intervals and 50-byte Appointments

| Packets per Schedule Interval (K) | Maximum Expected Packet Size | Total Appts. (A) | Schedule Efficiency | Bandwidth Efficiency | Packetization Delay |
|---|---|---|---|---|---|
| 22 | 1479 bytes | 660 | 93.1% | 96.9% | 5.45 ms |
| 23 | 1418 bytes | 667 | 92.1% | 96.8% | 5.22 ms |
| 24 | 1363 bytes | 672 | 91.4% | 96.7% | 5.00 ms |
| 25 | 1311 bytes | 675 | 91.0% | 96.5% | 4.80 ms |
| 26 | 1264 bytes | 676 | 90.9% | 96.4% | 4.62 ms |
| 27 | 1220 bytes | 675 | 91.0 | 96.3% | 4.44 ms |
| 28 | 1180 bytes | 672 | 91.4% | 96.1% | 4.29 ms |
| 29 | 1142 bytes | 667 | 92.1% | 96.0% | 4.14 ms |
| 30 | 1107 bytes | 690 | 89.0% | 95.9% | 4.00 ms |
| 31 | 1174 bytes | 682 | 90.1% | 95.7% | 3.87 ms |
| 32 | 1043 bytes | 672 | 91.4% | 95.6% | 3.75 ms |
| 33 | 1014 bytes | 693 | 88.7% | 95.5% | 3.64 ms |
| 34 | 986 bytes | 680 | 90.4% | 95.4% | 3.53 ms |
| 35 | 960 bytes | 700 | 87.8% | 95.2% | 3.43 ms |
| 36 | 936 bytes | 684 | 89.8% | 95.1% | 3.33 ms |
| 37 | 913 bytes | 703 | 87.4% | 95.0% | 3.24 ms |
| 38 | 891 bytes | 684 | 89.8% | 94.8% | 3.16 ms |
| 39 | 870 bytes | 702 | 87.5% | 94.7% | 3.08 ms |
| 40 | 851 bytes | 720 | 85.3% | 94.6% | 3.00 ms |
| 41 | 832 bytes | 697 | 88.1% | 94.5% | 2.93 ms |
| 42 | 814 bytes | 714 | 86.1% | 94.3% | 2.86 ms |
| 43 | 797 bytes | 688 | 89.3% | 94.2% | 2.79 ms |
| 44 | 781 bytes | 704 | 87.3% | 94.1% | 2.73 ms |
| 45 | 765 bytes | 720 | 85.3% | 93.9% | 2.67 ms |
| 46 | 750 bytes | 690 | 89.0% | 93.8% | 2.61 ms |
| 47 | 736 bytes | 705 | 87.1% | 93.7% | 2.55 ms |
| 48 | 723 bytes | 720 | 85.3% | 93.6% | 2.50 ms |
| 49 | 710 bytes | 735 | 83.6% | 93.4% | 2.45 ms |
| 50 | 697 bytes | 700 | 87.8% | 93.3% | 2.40 ms |
| 50 | 697 bytes | 700 | 87.8% | 93.3% | 2.40 ms |
| 51 | 685 bytes | 714 | 86.1% | 93.2% | 2.35 ms |
| 52 | 673 bytes | 728 | 84.4% | 93.1% | 2.31 ms |
| 53 | 662 bytes | 742 | 82.8% | 92.9% | 2.26 ms |
| 54 | 651 bytes | 756 | 81.3% | 92.8% | 2.22 ms |
| 55 | 641 bytes | 715 | 85.9% | 92.7% | 2.18 ms |
| 56 | 631 bytes | 728 | 84.4% | 92.6% | 2.14 ms |
| 57 | 622 bytes | 741 | 82.9% | 92.5% | 2.11 ms |
| 58 | 612 bytes | 754 | 81.5% | 92.3% | 2.07 ms |
| 59 | 603 bytes | 767 | 80.1% | 92.2% | 2.03 ms |
| 60 | 595 bytes | 720 | 85.3% | 92.1% | 2.00 ms |
| 61 | 586 bytes | 732 | 83.9% | 92.0% | 1.97 ms |
| 62 | 578 bytes | 744 | 82.6% | 91.8% | 1.94 ms |
| 63 | 570 bytes | 756 | 81.3% | 91.7% | 1.90 ms |
| 64 | 563 bytes | 768 | 80.0% | 91.6% | 1.88 ms |
| 65 | 555 bytes | 780 | 78.8% | 91.5% | 1.85 ms |
| 66 | 548 bytes | 726 | 84.6% | 91.4% | 1.82 ms |
| 67 | 541 bytes | 737 | 83.4% | 91.2% | 1.79 ms |
| 68 | 534 bytes | 748 | 82.1% | 91.1% | 1.76 ms |
| 69 | 528 bytes | 759 | 80.9% | 91.0% | 1.74 ms |
| 70 | 521 bytes | 770 | 79.8% | 90.9% | 1.71 ms |
| 71 | 515 bytes | 781 | 78.7% | 90.8% | 1.69 ms |
| 72 | 509 bytes | 792 | 77.6% | 90.7% | 1.67 ms |
| 73 | 503 bytes | 803 | 76.5% | 90.5% | 1.64 ms |

TABLE 23-continued

Example Schedule Parameters for E1 Circuits,
Asynchronous Method, with 120 ms Schedule Intervals
and 50-byte Appointments

| Packets per Schedule Interval (K) | Maximum Expected Packet Size | Total Appts. (A) | Schedule Efficiency | Bandwidth Efficiency | Packetization Delay |
|---|---|---|---|---|---|
| 74 | 498 bytes | 740 | 83.0% | 90.4% | 1.62 ms |
| 75 | 492 bytes | 750 | 81.9% | 90.3% | 1.60 ms |
| 76 | 487 bytes | 760 | 80.8% | 90.2% | 1.58 ms |
| 77 | 482 bytes | 770 | 79.8% | 90.1% | 1.56 ms |
| 78 | 476 bytes | 780 | 78.8% | 90.0% | 1.54 ms |
| 79 | 471 bytes | 790 | 77.8% | 89.8% | 1.52 ms |
| 80 | 467 bytes | 800 | 76.8% | 89.7% | 1.50 ms |
| 81 | 462 bytes | 810 | 75.9% | 89.6% | 1.48 ms |
| 82 | 457 bytes | 820 | 74.9% | 89.5% | 1.46 ms |
| 83 | 453 bytes | 830 | 74.0% | 89.4% | 1.45 ms |
| 84 | 448 bytes | 756 | 81.3% | 89.3% | 1.43 ms |
| 85 | 444 bytes | 765 | 80.3% | 89.1% | 1.41 ms |
| 86 | 440 bytes | 774 | 79.4% | 89.0% | 1.40 ms |
| 87 | 436 bytes | 783 | 78.5% | 88.9% | 1.38 ms |
| 88 | 432 bytes | 792 | 77.6% | 88.8% | 1.36 ms |
| 89 | 428 bytes | 801 | 76.7% | 88.7% | 1.35 ms |
| 90 | 424 bytes | 810 | 75.9% | 88.6% | 1.33 ms |

Figure 4:
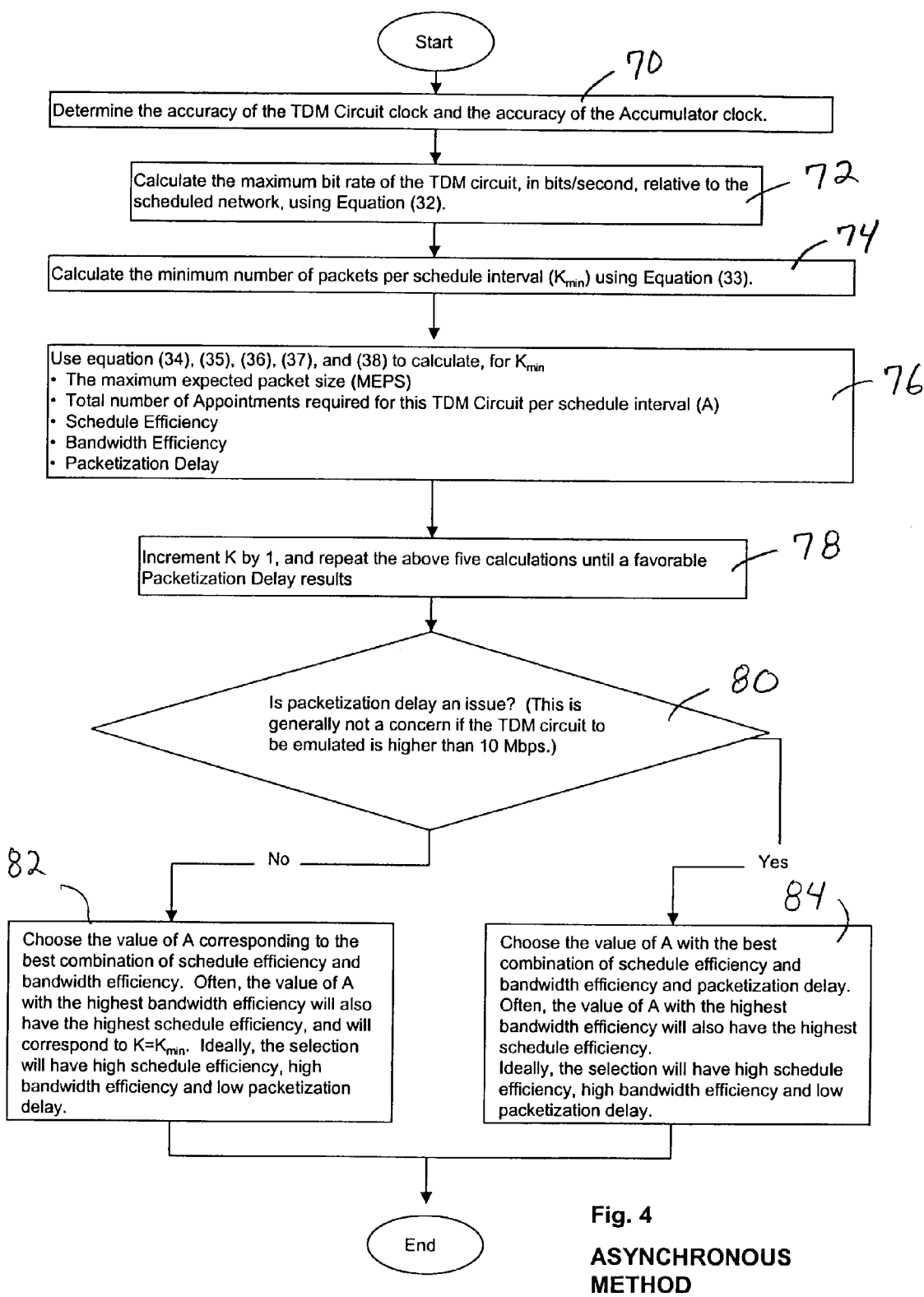
FIG. 4 is a process flow diagram for determining the minimum required number of appointments for any TDM circuit according to an alternative general asynchronous method embodiment of the present invention.

Those skilled in the art now have enough information to determine the minimum required number of appointments for a TDM circuit. The steps to perform the asynchronous embodiments of the invention for any Schedule Interval and Appointment are shown in FIG. 4.

First, the accuracy of the TDM circuit and accuracy of the Accumulator clock is determined 70. Next, the maximum bit rate of the TDM circuit relative to the scheduled network is calculated 72. The minimum number of packets per schedule interval (Kmin) is then calculated 74. The following parameters are then calculated 76 for Kmin: maximum expected packet size, total number of appointments required for this TDM circuit per schedule interval (A), schedule efficiency, bandwidth efficiency and packetization delay. The value of K is then incremented and these five parameters are recalculated 78 until a favorable packetization delay results.

Packetization delay is then considered 80. If packetization delay is an issue at this bit rate 84, then a value for the number of appointments required (A) is chosen with the best combination of schedule efficiency, bandwidth efficiency and packetization delay.

If packetization delay is not an issue at this bit rate, then a value for the number of appointments required (A) is chosen 88 with the best combination of schedule efficiency and bandwidth efficiency.

Although the invention is described with respect to illustrative embodiments thereof, those skilled in the art should appreciate that the foregoing and various other changes, omissions and additions in the form and detail thereof may be made without departing from the spirit and scope of the invention.

What is claimed is:

1. A method for mapping a Time Domain Multiplexed (TDM) circuit onto a scheduled packet network comprising:
   calculating a plurality of groups of appointments per scheduled packet;
   calculating for each of said groups of appointments per packet, a plurality of numbers of total appointments per schedule interval;
   selecting a specific groups of appointments per scheduled packet;
   selecting a specific total number of appointments per schedule interval; and
   mapping said TDM circuit to said scheduled network according to said selected number of appointments per scheduled packet and said total number of appointments per schedule interval.

2. The method according to claim 1 wherein said TDM circuit is synchronized to said scheduled packet network.

3. The method according to claim 2 wherein said plurality of numbers of appointments required per schedule interval are calculated according to the following formula:

$$A = (G \times SI)/(N_T \times T);$$

wherein

G is the group of appointments that each packet requires;
$N_T$ is the number of TDM frames in time interval T; and
SI is the schedule interval in milliseconds.

4. The method according to claim 1 wherein said TDM circuit is asynchronous to said scheduled packet network.

5. The method according to claim 4 wherein said group of appointments per scheduled packet (G) is determined according to the following formula:

$$G = A/K$$

wherein A is the total number of appointments required per schedule interval, and
wherein K is the number of packets per schedule interval.

6. The method according to claim 4 wherein said plurality of numbers of appointments required per schedule interval are calculated according to the following formula:

$$A = K \times \text{Roundup}(MEPS/Appt\_Size);$$

wherein

K is the number of packets per schedule interval,
MBPS is the maximum expected packet size in bytes,
Appt_Size is the appointment size in bytes and the roundup function rounds up to the nearest integer.

7. The method according to claim 1 further comprising:
determining schedule efficiency for said network for each of a plurality of groups of appointments per scheduled packet and for each of a plurality of total appointments per schedule interval;
determining bandwidth efficiency for said network for each of a plurality of groups of appointments per scheduled packet and for each of a plurality of total appointments per schedule interval; and
wherein said number of groups of appointments per scheduled packet and total number of appointments per schedule interval are selected according to a favorable combination of schedule efficiency and bandwidth efficiency.

8. The method according to claim 7 comprising
determining packetization delay for said network for each of a plurality of groups of appointments per scheduled packet and for each of a plurality of total appointments per schedule interval; and
wherein said number of appointments per scheduled packet and total number of appointments per schedule interval are selected according to a favorable combination of schedule efficiency and bandwidth efficiency and packetization delay.

9. The method according to claim 8 wherein said favorable combination includes a high schedule efficiency, a high bandwidth efficiency and low packetization delay.

10. The method according to claim 8 wherein said TDM circuit is synchronized to said scheduled packet network and said packetization delay is determined using the following formula:

$$\text{Packetization\_Delay} = N_T \times T;$$

wherein $N_T$ is the number of TDM frames in time interval T.

11. The method according to claim 8 wherein said TDM circuit is asynchronous to said scheduled packet network and said packetization delay is determined according to the following formula:

Packetization_Delay=SI/K;

wherein SI is the schedule interval in milliseconds, and K is the number of packets per schedule interval.

12. The method according to claim 7 wherein said TDM circuit is synchronized to said scheduled packet network and said schedule efficiency is determined according to the following formula:

$$\text{Sched\_Eff} = \frac{F_T \times SI}{A \times \text{Appt\_Size} \times T}$$

wherein
$F_T$ is the number of bytes per time interval T in milliseconds,
A is the total number of appointments per schedule interval,
Appt_Size is the appointment size in bytes, and
SI is the schedule interval in milliseconds.

13. The method according to claim 7 wherein said TDM circuit is synchronized to said scheduled packet network and said bandwidth efficiency is determined according to the following formula:

$$\text{BW\_Eff} = \frac{N_T \times F_T}{N_T \times F_T + (\text{Max\_IP\_Overhead})}$$

wherein
NT is the number of TDM frames in time interval T,
FT is the number of bytes per time interval T in milliseconds, and
Max_IP_Overhead represents the maximum total number of packet overhead bytes at or above the IP layer.

14. The method according to claim 7 wherein said TDM circuit is asynchronous to said scheduled packet network and said schedule efficiency is determined according to the following formula:

$$\text{Sched\_Eff} = \frac{\text{TDM\_BR}_{nom} \times SI}{\text{Appt\_Size} \times A}$$

wherein
$\text{TDM\_BR}_{nom}$ is the nominal TDM bit rate,
SI is the schedule interval in milliseconds,
Appt_Size is the appointment size in bytes, and
A is the total number of appointments per schedule interval.

15. The method according to claim 7 wherein said TDM circuit is asynchronous to said scheduled packet network and said bandwidth efficiency is calculated according to the following formula:

$$\text{BW\_Eff} = \frac{\text{TDM\_BR}_{nom} \times SI}{\text{TDM\_BR}_{nom} \times SI + (\text{Max\_IP\_Overhead} + 8 + K)}$$

wherein
TDM_BRnom is the nominal TDM bit rate,
Max_IP_Overhead represents the maximum total number of packet overhead bytes at or above the IP layer
SI is the schedule interval in milliseconds, and
K is the number of packets per schedule interval.

16. The method according to claim 1 wherein said plurality of numbers of groups of appointments per scheduled packet are calculated according to the following formula:

$$G_{\max} = \text{Interger}\left(\frac{\text{Maximum\_Packet\_Size}}{\text{Appt\_Size}}\right)$$

wherein
Maximum_Packet_Size is the maximum packet size in bytes,
Appt_Size is the appointment size in bytes, and
Gmax is the maximum contiguous group of appointments per scheduled packet.

17. A scheduled packet network emulating a time domain multiplexed (TDM) circuit wherein internet protocol (IP) packets are scheduled according to an itinerary of appointments and wherein said itinerary of appointments are configured by
calculating a plurality of groups of appointments per scheduled packet;
calculating for each of said groups of appointments per scheduled packet, a plurality of numbers of total appointments per schedule interval;
selecting a specific number of groups of appointments per scheduled packet;
selecting a specific total number of appointments per schedule interval; and
mapping said TDM circuit to said scheduled network according to said selected number of appointments per scheduled packet and said total number of appointments per schedule interval.

18. The scheduled packet network according to claim 17 wherein said TDM circuit is synchronized to said scheduled packet network.

19. The scheduled packet network according to claim 17 wherein said TDM circuit is asynchronous to said scheduled packet network.

20. The scheduled packet network according to claim 17 wherein said plurality of numbers of groups of appointments per scheduled packet are calculated according to the following formula:

$$G\max = \text{Integer}\left(\frac{\text{Maximum\_Packet\_Size}}{\text{Appt\_Size}}\right)$$

wherein
Maximum_Packet_Size is the maximum packet size in bytes,
Appt_Size is the appointment size in bytes, and
Gmax is the maximum contiguous group of appointments per scheduled packet.

21. A scheduled packet network emulating a time domain multiplexed (TDM) circuit wherein internet protocol (IP) packets are scheduled according to an itinerary of appointments, said network comprising:

means for calculating a plurality of groups of appointments per scheduled packet;

means for calculating a plurality of numbers of total appointments per schedule interval for each of said groups of appointments per scheduled packet; and means for mapping said TDM circuit to said scheduled network according to a selected favorable number of appointments per scheduled packet and a selected favorable total number of appointments per schedule interval.

22. The scheduled packet network according to claim 21 wherein said plurality of numbers of groups of appointments per scheduled packet are calculated according to the following formula:

$$Gmax = \text{Integer}\left(\frac{Maximum\_Packet\_Size}{Appt\_Size}\right)$$

wherein

Maximum_Packet_Size is the maximum packet size in bytes,

Appt_Size is the appointment size in bytes, and

Gmax is the maximum contiguous group of appointments per scheduled packet.

* * * * *